(12) United States Patent
Dial et al.

(10) Patent No.: US 8,386,361 B1
(45) Date of Patent: *Feb. 26, 2013

(54) METHOD AND SYSTEM FOR EVALUATING TARGET DATE FUNDS

(75) Inventors: Glenn Dial, Windermere, FL (US); Katherine Santiago, New York, NY (US); Mark Browne, Short Hills, NJ (US); Anne Lester Trevisan, Princeton, NJ (US); Lynn Avitabile, Summit, NJ (US); David Musto, New Canaan, CT (US); William I Mauck, Englewood, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/566,312

(22) Filed: Aug. 3, 2012

Related U.S. Application Data

(63) Continuation of application No. 12/269,197, filed on Nov. 12, 2008, now Pat. No. 8,255,308.

(60) Provisional application No. 61/076,990, filed on Jun. 30, 2008.

(51) Int. Cl.
*G06Q 40/00* (2012.01)

(52) U.S. Cl. .................................................... 705/36 R

(58) Field of Classification Search .................. 705/36 R
See application file for complete search history.

(56) References Cited

PUBLICATIONS

Smith, Lisa: The Pros and Cons of Target-Date Funds, Feb. 13, 2007, Investopedia, pp. 1-5.*
My Money Blog: Target Retirement Mutual Funds: T. Rowe Price vs. Vanguard, Dec. 4, 2006, pp. 1-5.*
Idzorek, Tom: Lifetime Asset Allocations: Methodologies for Target Maturity Funds, Ibbootson Associates Research Report, Feb. 11, 2008, pp. 1-47.*

* cited by examiner

*Primary Examiner* — Bijendra K Shrestha
(74) *Attorney, Agent, or Firm* — Goodwin Procter LLP

(57) ABSTRACT

The invention generally concerns systems, methods, and apparatus wherein a computer may receive information concerning a group of target date funds from a database. Information about the target date funds may comprise information about the glide path and the target retirement date of that fund. A diversification level of each of the target date funds may be determined from the received information. An equity ratio may also be determined for each of the target date funds using the received information. In some instances, the equity ratio may be based upon the amount of equity projected to be owned by the target date fund upon the target retirement date. After determining an equity ratio and a diversification level, a summary of the group of funds is output for review by a user. The summary may include a summary or graph of the diversification levels and equity ratios of the target date funds.

34 Claims, 13 Drawing Sheets

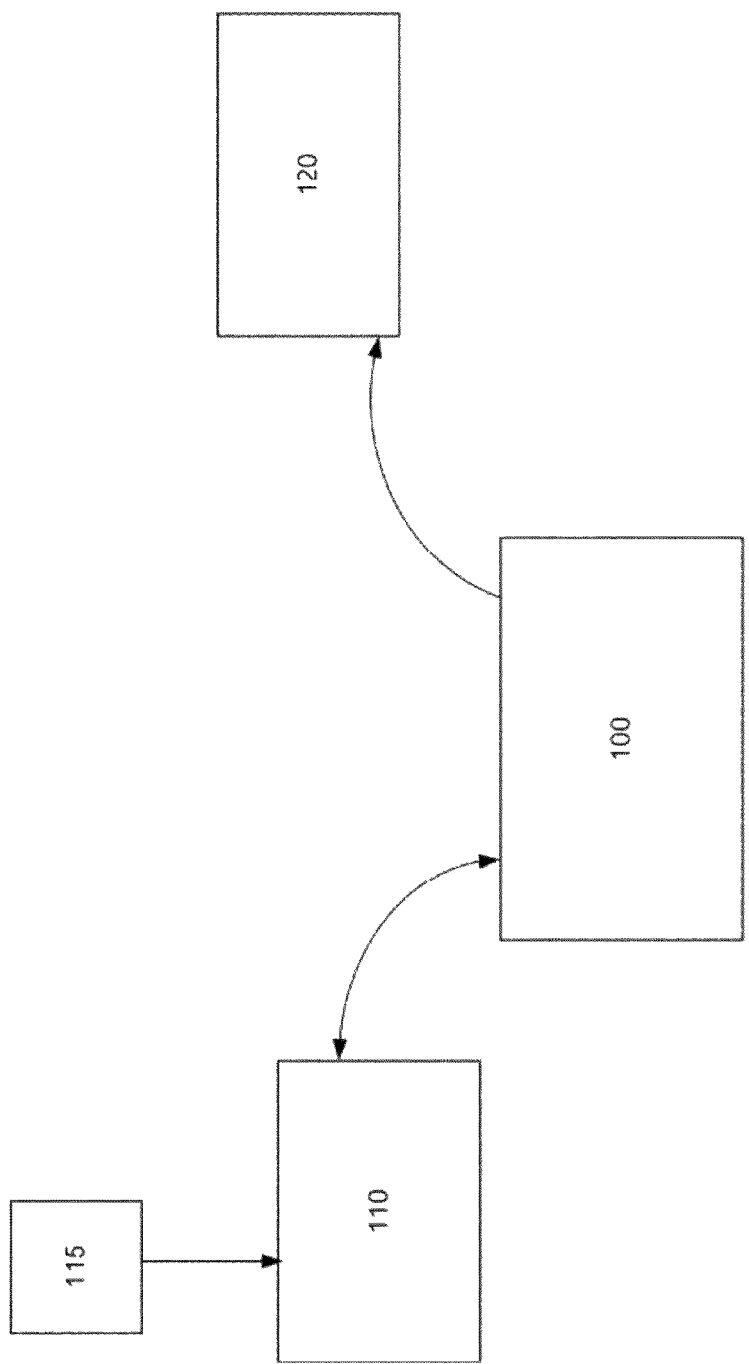

For each decision, please indicate a point between 1 and 5 that reflects your preference between the left and right options:

| | | |
|---|---|---|
| 810 — Seek to increase the likelihood that participants achieve their income replacement objectives at point of retirement. | ① ② ③ ④ ⑤ | Seek to increase the likelihood that participants maximize total capital appreciation over their lifetimes. |
| 820 — Participants may regularly interrupt savings through the use of 401(k) loans and withdrawals to address "life events". | ① ② ③ ④ ⑤ | Participants generally maximize savings and rarely take loans or other pre-retirement distributions. |
| 830 — A target date offering that seeks to provide down-side risk protection and is willing to forgo some up-side return. | ① ② ③ ④ ⑤ | A target date offering that seeks to achieve the highest level of participant returns despite the level of down-side risk. |

Score:

Figure 8

METHOD AND SYSTEM FOR EVALUATING TARGET DATE FUNDS

RELATED APPLICATIONS

This patent application is a continuation of U.S. Utility application Ser. No. 12/269,197, filed Nov. 12, 2008, which claimed priority to U.S. Provisional Application No. 61/076,990, filed Jun. 30, 2008. Both the utility application and provisional application are incorporated herein by reference in their entireties.

FIELD OF THE INVENTION

Embodiments of the present invention relate generally to funds that reallocate asset class mixes (asset allocation) over the life of those funds, and more specifically to methods, systems, and apparatus for evaluating those funds for assisting an investor.

BACKGROUND OF THE INVENTION

Investment and financial markets have long presented many different types of investors with a range of possibilities and options of vehicles in which to place capital. Institutional defined contribution and retail retirement investors are two of the many kinds of investors. Retirement investors are long-term investors that are tasked with finding the most desirable and appropriate investment mix (allocation) and investment vehicles for saving enough money for eventual retirement. Other types of long-term investors find themselves in similar circumstances; such as education savings plan participants and individuals saving for major life changes or purchases. These investors are presented with a plethora of vehicles and asset classes in which to divest, and are routinely advised that diversification is their best strategy for long-term investment. As a result of the numerous options presented to these individuals, many of these investors become confused or frustrated when attempting to create a desirable mix of assets and investments. Accordingly, many of these investors turn to institutional investment entities (such as registered financial advisors) or to an organization they are affiliated with, such as their employers, in order to receive investment guidance or services. These entities may also be known generally as "plan sponsors." In some cases, plan sponsors may be selected by an employer to provide investment services to its employees in a retirement investment vehicle, such as a 401k or 403b plan.

Plan sponsors specialize in advising investors (participants/employees) and assisting those investors in finding (products are usually chosen by the plan sponsor and participants are usually limited to the products appearing in the plan's investment line-up) desirable investment products. Plan Sponsors may also be considered the group of people (trustees) representing the employer who tale on fiduciary responsibility to provide the facility or mechanism to save for retirement in line with the various regulations governing this arrangement. A Plan Administrator or record keeper may specialize in communicating to participants on behalf of the plan sponsor to help advise participants on how much and what to invest in—although the plan sponsor may be responsible for choosing and providing the menu of investment strategies. Many of these products are run by investment managers which manage individual products such as mutual funds, hedge funds, index funds, retirement funds, commingled funds, funds-of-funds. (Participants can choose from a menu of individual mutual or commingled strategies to include in their portfolio allocation, in amounts/percentages of their choosing), and other types of funds that mix various individual investments into a single package—such as a balanced fund, risk-based fund or target date fund (where portfolio asset allocation is conducted by the portfolio/investment manager). These packages may then be presented to an individual investor (participant) through the plan sponsor. In some cases, the investment manager may work directly for the plan sponsor, and in some cases the manager may be separate from the plan sponsor.

Many of the various investment options available through a plan sponsor are targeted to different types of investors (those with different levels of investment sophistication, expertise, and desired engagement in managing their retirement assets). The differences between investment packages is a function of both the form of the packages themselves, as well as the management style of the investment managers behind those packages. For example, mutual funds are investment assets that are managed by professional fund managers. These funds pool money from all investors in the mutual fund in order to purchase stocks, bonds, money market instruments, foreign currencies, and/or other types of investment securities. Ordinary mutual funds may vary widely in asset composition, as well as the management strategy behind that composition.

In some situations, where a plan sponsor is an employer or other entity that assists or acts as a gatekeeper for individuals selecting retirement plans, the sponsor may provide a Qualified Default Investment Alternative ("QDIA") to investors. To encourage higher participation rates and potentially better investment outcomes, the Pension Protection Act of 2006 provides Plan Sponsors with a safe harbor provision allowing plan sponsors to automatically enroll employees into the plan and default them into a QDIA (the employee can decide to opt out). These kinds of investors may be referred to as "delegators."—i.e., participants who do not have the time, expertise or inclination to manage their portfolio of funds available through the plan—and who otherwise may not have enrolled in the company's 401k retirement savings plan. When a plan sponsor chooses a QDIA for participants, the sponsor is taking up a responsibility to select an optimal or close to optimal plan (investment solution) for all participants who are defaulted or elect to choose the QDIA. Therefore it is important to analyze and evaluate QDIA carefully to ensure that the QDIA chosen by the plan is the best choice given plan goals and objectives and participant's needs (and risk tolerances)—i.e., the QDIA strategy is aligned with plan goals and participant needs. By far the most popular choice of QDIA are Target Date Funds In order to show how differences in asset composition can change the characteristics of a fund, two illustrative funds can be examined. In one fund, a majority of the fund may be made up of bonds and hard currency, yielding a more stable and secure investment, at the sacrifice of the possibility for high returns do to the low-risk nature of the heavily invested assets. In another fund, a majority of the fund may be made up of foreign and speculative stocks or commodities futures, which yield a much riskier investment that has higher potential for rewards or, conversely, losses, at the sacrifice of stability.

Many of the funds described above are asset class-specific funds that present those individuals that invest therein with exposure to a single asset class, such as U.S. stocks, emerging market stocks, high yield bonds, or sometimes a subset of an asset class, such as U.S. small cap growth stocks. Together, shareholders of an asset class-specific fund benefit from their collective purchasing power and asset pool in receiving the expertise of the fund manager that they could not afford individually.

Asset class-specific funds have been incredibly popular with investors in recent years because of their low-maintenance posturing for the shareholder and their historically positive performance in the financial markets. Accordingly, in 2006 there were over 8,600 mutual funds available in the United States. In order to assist the individual investor with selecting amongst these vast options in the asset class-specific fund space, fund rating agencies such as Morningstar, Standard & Poor's, Moody's, and others, emerged. These rating agencies compare the historical returns of a fund with those of other funds and compute ratings based on that performance. While each agency has a separate proprietary method of calculating these ratings, all of the ratings focus on a return on the investment as the predominant underlying variable.

Asset class-specific funds, however, are not without their drawbacks. Most of these funds are created with a specific investment strategy in mind. For example, a technology-based fund might invest in stocks of Apple, Microsoft, Adobe, and Sun Microsystems, and a government bond-based fund might instead invest in state infrastructure program bonds and U.S. Treasury bonds. While the fund manager has the ability to buy and sell securities within a given fund, the fund manager is bound by the underlying investment strategy of the fund. Accordingly, a bond-based fund will almost always consist predominantly of bonds and a stock-based fund will likewise consist primarily of stocks. This inherent characteristic of asset class-specific funds creates a problem for aging retirement investors transitioning from a high-growth investment strategy to a shorter-term liquidity-oriented strategy. Those individuals traditionally were required to manage their asset allocation themselves, or with the help of an advisor, and move their investments from one fund to another to adjust their asset allocation over time, creating additional concern, confusion, and complication for the investors. These funds likewise present problems for plan sponsors setting up QDIAs that will be used by delegators over the life of their retirement investment period; delegators are not known for actively adjusting a portfolio to match the proper cycle in retirement investing.

Target date funds are funds that adjust their asset allocations as they mature towards a certain predetermined date. A predetermined date may be one example of a target date, and may be related to a life or financial event, such as retirement, the purchase of a house or other major expenditure (e.g., car or boat), sending children off to college, and the like. These asset allocation adjustments follow what is commonly called a "glide path." For example, in 2007 a 2040 target date fund may contain a high percentage of stocks and other high growth assets, while only holding a limited number of short-term securities. In contrast, in 2037, that same 2040 target date fund might contain a high percentage of short-term securities, while only holding a more limited number of stocks and other high growth assets. As the example above shows, the target date fund is rebalanced according to its glide path and becomes more conservative as the target date arrives. This is done to enhance the growth potential in early years of the fund, while maintaining stability in the last few years before the fund reaches its target date. Some funds continue to adjust their asset allocation for a period of time after the target date is reached. Each individual target date fund has a slightly different glide path that is determined by a manager of the fund. The glide path of any individual fund can also be modified as time moves forward in response to any unpredicted market conditions or events.

As target date funds have been growing in popularity, criticism of those funds has also grown. A lot of this criticism has centered upon the "one size fits all" structure of a target date fund. For example, though there are multiple investment managers offering 2040 target date funds, each individual fund manager will have different ideas regarding the optimal allocation of asset classes and how to spread those classes within industries and available vehicles. One fund manager may choose a more passive strategy and pick index funds to make up the asset class components, while another fund manager may select to actively manage the fund in an effort to beat the indexes. Also, not all target date strategies' glidepaths end at retirement. Depending on the target date strategy's philosophy, a glidepath may end at retirement or at some stage beyond retirement date. These differences are not necessarily readily apparent to the casual retirement investor that relies upon the simplicity of the target date fund structure, and yet these differences are of paramount importance to an investor in search of a target date retirement investment that comports with his overall risk tolerance and investment philosophy, especially in the context of what he chooses to do with his savings at the retirement date (e.g., withdraw his savings to purchase an annuity or keep his savings in the plan). These differences may also account for significant performance and risk dispersion between target date funds that may have the same target date. Additionally, the plan's view of participants' investment time horizons may differ. For example, plan sponsors may take the view that they want to ensure that participants have enough money at retirement age 65 to be able to replace their working income (i.e., "to" income replacement retirement strategy). Alternatively, plan sponsors may take the view that they want to ensure that participants do not run out of money in retirement (i.e., "through" retirement strategy). Either way, it is crucial that the plan's view on investment time horizon as it relates to participant's savings balances is aligned with that of the chosen target date solution.

Accordingly, another major drawback when evaluating and selecting target date funds instead of traditional asset class-specific funds is that there are no widely accepted and effective evaluation systems/processes for these investments. In fact, it has been suggested that the evaluation methods used in assessing and evaluating traditional mutual funds and investment solutions are not relevant when evaluating a target date fund, as these methods do not address the primary objective of a target date fund: the likelihood of its ability to provide participants with enough money at retirement While asset class-specific funds can be easily evaluated based on past performance, historical rates of return, and historical risk, those same measures do not properly measure the effectiveness, diversification, and risk of the various target date funds currently on the market, The allocations of traditional asset class-specific funds stay constant throughout the years as the fund is offered to consumers pursuant to the underlying strategy of the fund. However, target date funds are designed to change allocations over time, and therefore have an underlying strategy that is constantly in flux. Furthermore, the goal of a target date fund is different than the goal of an asset class-specific fund. A target date fund seeks to provide for retirement or other type of savings at a specified point in the future, whereas asset class-specific funds are simply designed with an objective of generating returns at or above the market. Consequently, many evaluation methods for traditional funds are not optimal for application to target date funds as those methods are targeted towards an evaluation of recent short-term gains, such as over six to twelve month periods Plan sponsors have been given, in recent years, new opportunities to encourage more consistent savings and investing behavior among their respective plan participants. Some of these new opportunities include (1) the freedom to shore up employees' retirement security with safe harbors to create default participation in plans, (2) the ability to automatically enroll individuals in QDIAs that may help sponsors generate better returns for participants, and (3) the power to automatically escalate contributions.

To take advantage of the safe harbor relief, as stated above, it will be beneficial for plan sponsors to select a broadly diversified QDIA that is consistent with plan goals and objectives and to develop a clear and documented process for their rationale. Unfortunately, many vastly different target date funds are routinely presented to plan sponsors for selection as if each of the presented funds were similar in architecture and risk and consistent and simple rationales for the selection of funds are not currently available, leading to many mistakes in QDIA fund selection. As plan sponsors make decisions about their programs, it will be beneficial that they modify their Investment Policy Statements (IPS) so that they become an accurate blueprint of the design of their plans, including investment selection, glide paths, time horizons, desired outcomes, and how these elements, and many others, relate to plan goals and objectives.

Of the default investment options, target date funds are gaining momentum among plan sponsors as they have with other varieties of investors. These strategies, which provide a glide path that automatically rebalances to a more conservative mix as a specific date approaches, can, when combined with auto enrollment options, offer the best opportunity for income replacement. This is especially true among the delegators, who tend to be least involved in retirement planning.

The new opportunities provided to plan sponsors also come with some responsibilities. Target date funds are very popular as default investment options, however, the criteria that plan sponsors may have relied upon to evaluate funds in the past do not apply to target date funds. Plan sponsors should review asset classes, strategies, and access options and how the funds will be used, in tandem with participant behavior patterns, to assess how their choices will affect eventual outcomes for plan participants. Unfortunately, no uniform method of conducting such a review and analysis currently exists.

It should be readily apparent to those skilled in the art that the above situations and others of their kind do not satisfactorily address the needs and desires of investors, plan sponsors, and investment houses at large. Unfortunately, as has been shown above, no such evaluation tool has been created.

More broadly, no system currently exists that provides a way to assess and select target date funds based on what is the most appropriate design for a specific plan or investment strategy. No system currently exists in which plan sponsors or other investors can examine plan goals, participant behavior, and risk tolerance to determine how these factors will affect target date design.

Other problems and drawbacks also exist.

SUMMARY OF THE INVENTION

Accordingly, one aspect of the invention is to address one or more of the drawbacks set forth above.

According to embodiments of the present invention, a computer may receive information concerning a group of target date funds from a database. Information about the target date funds may comprise information about the glide path and the target retirement date of that fund. A diversification level of each of the target date funds may be determined from the received information. An equity ratio may also be determined for each of the target date funds using the received information. In some instances, the equity ratio may be based upon the amount of equity projected to be owned by the target date fund upon the target retirement date. After determining an equity ratio and a diversification level, a summary of the group of funds is output for review by a user. The summary may include a summary or graph of the diversification levels and equity ratios of the target date funds.

In some aspects of the invention, goals or objectives of a customer or representative of a customer may be determined. Goals or objectives may be based upon the customer's answers to questions concerning diversification risk and overhead, as well as the pros and cons of high and low equity allocations. In some instances, these determined goals or objectives may be used in identifying specific target date funds that are optimally suited for that customer or for a plan to be used by the customer.

In some other aspects of the invention, a grid may be created for plotting determined characteristics of the various target date funds that have been evaluated. In some instances, the grid may be divided into groups, such as quadrants, for easily identifying different kinds of similarly situated funds. In some aspects of the invention, information about determined goals or objectives of investors may be displayed on the grid alongside information concerning the target date funds that have been evaluated.

The present invention, which in some instances may be referred to as Target bate Evaluator, has numerous benefits and advantages. Having described a number of different embodiments of the invention, it should be apparent to the person of ordinary skill that the invention has numerous benefits and advantages. For example, the ability to quickly organize and categorize target date funds for lay investors enables those investors and the sponsors of plans that must select QDIAs for investors to select appropriate target date funds with minimal confusion.

The ability to present the organization and categorization of those target date funds into a simple, one page visual chart such that a minimal amount of cognitive effort is required in order to process the displayed information when selecting a plan further adds to the ability for the invention to assist investors and plan sponsors in the selection of optimal target date funds.

The determination of ideal factors for a given participant or for participants of a plan sponsor's plans to be used in selecting optimal plans for those participants or plan sponsors allows, for the first time, decision makers to understand how various target date funds comport or, just as importantly, fail to match up, to the goals and objectives of the participant or plan to which a fund is being selected.

The ability for plan sponsors to maintain a written record of their decision making process when determining an optimal target date fund to be offered as a QDIA for individuals participating in the sponsor's investment plans yields a Further, the ability to superimpose or align the characteristics of an ideal target date fund over or with a grid or coordinate system showing the universe, or a sub universe of available target date funds, allows for a systematic way to select optimal target date funds in an atmosphere that previously was vastly too complicated for most ordinary participants and plan sponsors to understand.

Because the invention allows all types of investors and investment decision makers to understand the universe of target date funds and how those funds relate to that individual's best interests, the present invention presents a new paradigm for investment and retirement planning that previously was not available.

Other embodiments, uses and advantages of the present invention will be apparent to those skilled in the art from consideration of the specification and practice of the invention disclosed herein. The specification and examples should be considered exemplary only.

Accordingly, it is one object to overcome one or more of the aforementioned and other limitations of existing systems and methods for evaluating target date funds.

It is another object to provide a system and method for enabling a simple and straightforward method of determining the differences between various target date funds.

It is another object to provide a system and method that allows plan sponsors to create a record of the method of selection of a QDIA for plan participants, and to make sure that the selected QDIA is best suited to the needs or goals of those plan participants.

It is another object to provide a system and method that allows for the determination of ideal characteristics of target date funds for an individual or for participants of a retirement plan so that the selection of the optimal target date fund can be made for those individuals.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, including the figures, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which:

FIG. 1 is a system of evaluating funds according to various embodiments of the present invention.

FIG. 8 is a sampling of an illustrative questionnaire directed to percent of equities needs according to various embodiments of the present invention.

DETAILED DESCRIPTION OF THE INVENTION

Figure 2A:
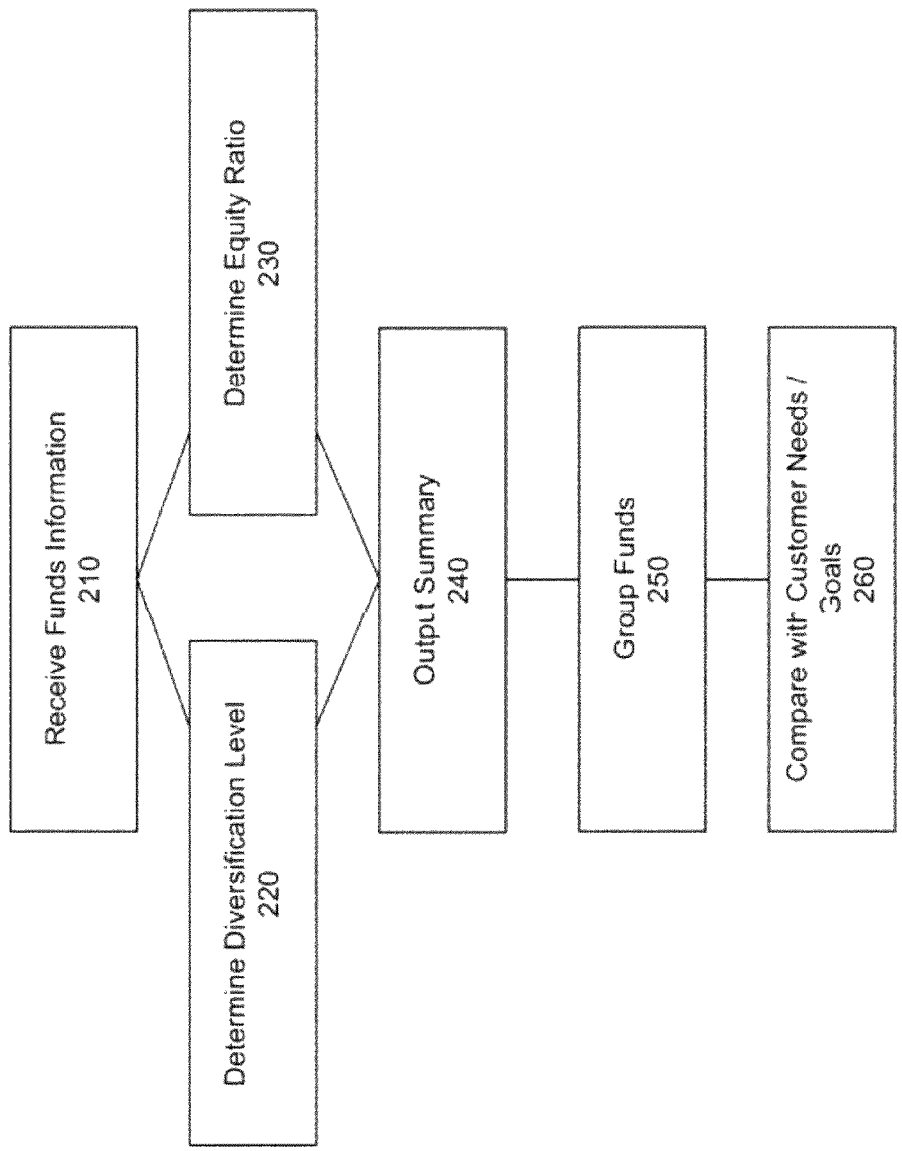
FIGS. 2A-B are flow diagrams for evaluating funds in accordance with various needs or goals of a customer according to various embodiments of the present invention.

Embodiments of the present invention are directed to methods, systems, and apparatus for evaluating target date funds, and for determining optimal target date funds for investment by individuals and retirement plans based on a set of customer specific criteria.

FIG. 1 illustrates a system of evaluating funds in accordance with embodiments of the invention. In some aspects of the invention, a processor 100 is connected to a network interface 110. In some aspects of the invention, network interface 110 may connect to a network such as the Internet. In other aspects of the invention, network interface 110 may connect to a different type of network such as a proprietary network, commercial network, ad hoc network, or other network known to those of skill in the art. In still other aspects of the invention, network interface 110 may connect to an internal computer bus in order to communicate with other elements of a general purpose computer. In some aspects of the invention, network interface 110 may connect processor 100 to database 115. Database 115 may comprise any type of computer-readable medium appreciated by those of skill in the art and may be local or remote to processor 100. In some aspects, database 115 may be a third-party database that has granted access to the data contained therein to processor 100. In some aspects of the invention, processor 100 may be connected to an output device 120. Output device 120 may be a video display, a speaker, a printer, a device for encoding on a computer-readable medium (such as a CD ROM, hard disk drive, database, flash memory, disk, or any other type of memory), a separate general purpose computer, or any other type of output device appreciated by those of skill in the art. In some other aspects, output device 120 may be a network connection to another device over a network such as the Internet. In some embodiments of the invention, processor 100, network interface 110, and output device 120 may all be elements of a general purpose computer. In still other embodiments, each may be elements of separate computing devices, interconnected by a network.

The elements of FIG. 1 may include the use of instructions executed on a computer. The processor 100, network interface 11.0, or output device 120 as shown in FIG. 1 may be or include a computer system or multiple computer systems. The system of FIG. 1 may be described in the general context of computer-executable instructions, such as program modules, being executed by a computer. Generally, program modules include routines, programs, objects, components, and/or data structures, etc. that perform particular tasks.

Those skilled in the art will appreciate that the invention may be practiced with various computers or computer devices, including hand-held wireless devices such as mobile phones or PDAs, lap-tops, desktop computers, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system or platform.

The memory normally includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The system of FIG. 1 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code in a particular programming language may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, Visual Basic, and/or JavaScript, just by way of example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media, such as in database 115. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer that may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the systems and methods of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices, such as output device 120, may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN), a wide area network (WAN), wireless personal area network (PAN), and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

For sonic aspects of the invention, such as for the transfer of payments, the communications infrastructure may include networked systems such as the Electronic Funds Transfer (EFT) network, credit card network (e.g., so-called "interchanges"), debit network, ATM network, ACE network, and other communication channels known in the industry for implementing transactions such that those described herein.

Although many other internal components of the computer are not shown, those of ordinary skill in the art will appreciate that such components and the interconnections are well known. Accordingly, additional details concerning the internal construction of the computer need not be disclosed in connection with the present invention.

FIG. 2A depicts a flow diagram for evaluating funds in accordance with various needs or goals of a customer according to various embodiments of the present invention. First, at step 210, information about target date funds to be evaluated is gathered. This information may be gathered from a proprietary or third-party database, or a series of databases. In some aspects of the invention, this data may come from investment or financial institutions that market or manage the target date funds to be evaluated. In still other aspects, the information may be first gathered and collated by a third party organization, and then received from the third patty organization. In still other aspects, information about target date funds to be evaluated may be proprietary information under control of the same entity that is conducting the method of evaluating funds described herein.

In some aspects and embodiments of the invention, a diversification level and/or equity ratio may be determined at steps 220 and/or 230. Various embodiments and aspects of the invention contemplate conducting these steps either serially or in parallel. In those embodiments and aspects where steps 220 and 230 are conducted serially, they may be conducted in any order.

In some aspects of the invention, step 220 determines a diversification level of each of the various target date funds to be evaluated. Diversification levels may be based on various optional factors, and may be embodied as a ratio, value, percentage, ordinal, or any other metric, including any discrete or continuous valuation, appreciated by those of skill in the art. In one illustrative example, a diversification level may be on a scale from 1-15, where lower values represent lower diversification amongst asset classes in a fund. In still another illustrative example, a diversification level may be between 0 and 1 (or 0% and 100%), where lower values represent lower diversification amongst asset classes in a fund. In still other examples, higher values may represent lower diversification amongst asset classes in a fund. In various embodiments and aspects of the invention, an asset class may be defined by whether the asset is equity, whether the asset is a bond, the category of business to which the asset is tied, a subcategory of business to which the asset is tied, the credit worthiness of a business to which the asset is tied, market capitalization or region of the business to which the asset is tied, duration of life or existence of the assets (such as with bonds), or any other type of asset distinctions appreciated by those of skill in the aft. In some aspects of the invention, a specific asset owned by the fund may be a fund itself, and may have multiple asset classes within it. In some of those aspects, the specific asset's diversification level may be evaluated based upon the various assets and allocation of those assets contained therein.

In determining the asset diversification level at step 220, the method may evaluate whether a given target date fund invests in traditional asset classes or in an extended set of asset classes. In one illustrative example, a diversification level for a particular target date fund may be calculated by exposure to twelve separate asset classes as reported by Morningstar through asset allocation, style, sector, and country data. In the example, the twelve separate asset classes may be large cap equity, mid cap equity, small cap equity, developed international equity, emerging markets equity, REITs, commodities, U.S. fixed income, high yield, TIPS/inflation, international fixed income, and emerging markets debt. In other examples, real estate, Money markets, cash equivalents, domestic investment grade debt, long duration, and short term fixed income may also be considered as separate asset classes. In this illustrative example, a minimum threshold of 2% for exposure to an asset class may be met to receive credit for exposure to that asset class. In this example, a diversification level of anywhere from one to twelve is possible, given the number of asset classes that are included in a given fund that meet the minimum threshold allocation. Commodities exposure may be calculated separately or inclusively and may add to or detract from the diversification valuation determined above. In some different variations of the example, funds from an individual management company may be evaluated individually, or a company-wide diversification level may be determined through an evaluation across each of the company's suite of target-date funds. In some variations of the example, the diversification valuation determined above may be adjusted higher or lower if a minimum threshold allocation is made to an underlying mutual fund that is categorized as either a specialty-natural resources, hedge funds, long and short assets, direct real estate, currency, convertibles, sector specific assets, futures, allocated or strategic assets, foreign real estate, or specialty-precious metals fund. In still other variations, adjustments may be made based upon other specially underlying funds in the target date fund that meet a minimum asset allocation threshold. In some cases, this threshold may be a percentage, such as 2%, and in other cases, the threshold may be zero.

In some aspects of the invention, step 230 determines an equity allocation ratio of each of the various target date funds to be evaluated. The equity allocation ratio may be obtained from information published by the manager of a target date fund, as published in prospectuses, term sheets, registrations, and other marketing materials relating to the fund. Equity allocations may be derived from the glide path of the target date fund on the prospectus. In some of these aspects, an equity allocation ratio may be determined from the projected equity allocation at a predetermined point in time. In some aspects, this time may be at the target date of retirement for the specific target date fund. In some other aspects, this time may be after the target date of retirement, such as at a terminal equity allocation value. In still other aspects, this time may be before the target date of retirement, such as at the time of evaluation of the fund or a number of years before the target date (for example, one, five, ten, fifteen, twenty, or twenty five years before). In still other aspects, equity allocations may be derived from other public or proprietary information, such as newswires, fund information services such as Morningstar™, historical information about the manager or management team running the fund, or other information possessed by the entity conducting the fund evaluation. In some of these instances, historical information about the past performance of fund managers running target date funds may be used to extrapolate or predict the future management of target date funds being evaluated.

In one illustrative example, a percentage of equity exposure may be calculated at a target age of 65. In this example, the target age of 65 is also the target date of retirement for the funds being evaluated. In this example, the percentage of equity may be gathered from the prospectus of the company that manages the target date fund being evaluated. Here, the prospectus may say that, upon reaching the target date of the fund, the equity allocation may be 10%. Accordingly, the percentage of equity exposure would be 10% or 0.1.

After determining the appropriate diversification levels and equity ratios, some aspects and embodiments of the invention may output a summary of the determinations on each of the funds at step 240. In some of the various embodiments of the present invention, a Cartesian coordinate system may be created for display to an individual. In some aspects of the invention, the Cartesian coordinate system may be two-dimensional. In still other aspects, the Cartesian coordinate system may be three-dimensional or multi-dimensional. In some of the embodiments of the invention, the Cartesian coordinate plane may contain axes measuring the determined diversification levels of the various target date funds against determined equity allocation ratios of those funds.

Figure 4:
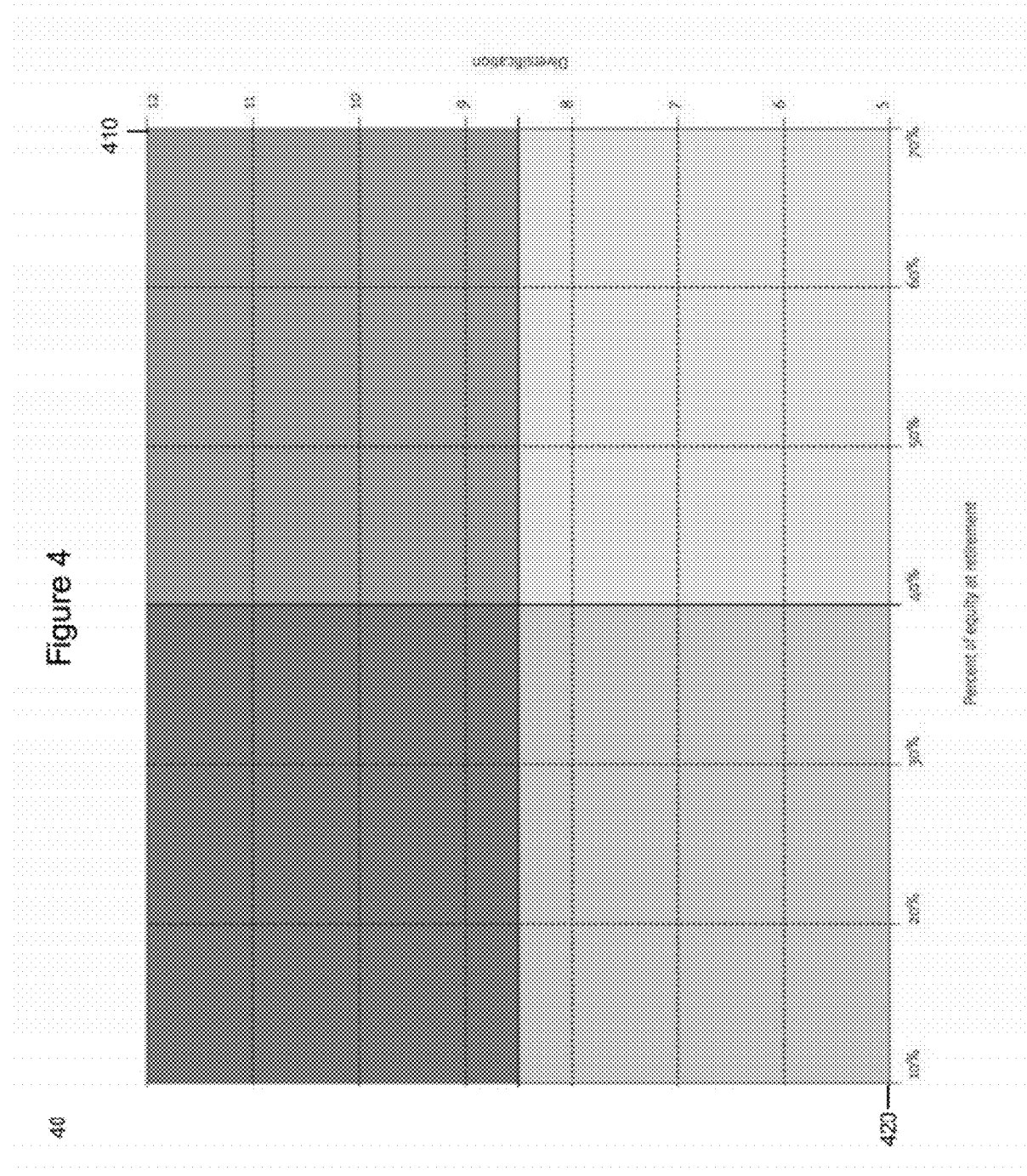
FIG. 4 illustrates a two-dimensional display from a system for evaluating funds according to various embodiments of the present invention.

An illustrative example of a two-dimensional coordinate system to be output at this step is shown in FIG. 4. There, coordinate system 400 contains two axes, Axis 410 may measure a diversification level of funds to be plotted on coordinate system 400. Axis 420 may measure a percentage/ratio of equity at the target date of retirement of funds to be plotted on coordinate system 400.

In still other of the various embodiments of the invention, the diversification levels and equity ratios may be saved in a computer-readable file for use on a personal computer device, mobile computing device, or any other type of specialty or general purpose computer. Other embodiments contemplate printing to a screen, paper, or other output, a listing of evaluated target date funds, along with the corresponding diversification levels and equity ratios for those funds. In some aspects of the invention, the funds may be filtered based on pre-selected or predetermined variables. In other aspects, the funds may be divided into groups based on the determined diversification levels or equity ratios. In still other embodiments of the invention, a computer display may be presented with controls for a user to filter a listing or graphical representation of the evaluated target date funds as described above.

According to some of the various embodiments of the invention, optional step 250 may group various funds in the output summary so that similarities and differences amongst those funds may be more readily apparent. In some of these embodiments, individual funds may be grouped by proximity to one another. In some aspects, the grouped funds may be identified by visual indicia, such as coloring or the circling of those funds. In some other aspects of the invention, a Cartesian coordinate system may be displayed to a user, with individual funds plotted on that system. In these aspects, the coordinate system may be divided into quadrants, such that each quadrant identifies similarly situated target date funds, in still other embodiments of the invention, target date funds may be split into subgroups. These subgroups may be based on similarities in asset diversification or equity allocation ratios. These subgroups may also be based on other factors and characteristics of target date funds being evaluated. In these instances, funds may be grouped based on whether a fund maintains a passive or active management style, or based on whether the fund is a single- or multi-family.

As one illustrative example, one quadrant may signify a lower equity allocation ratio and high diversification level. A second quadrant may signify a lower equity allocation ratio and low diversification level. A third quadrant may signify a high equity allocation ratio and low diversification level. A final, fourth quadrant may signify a high equity allocation ratio and a high diversification level.

According to some of the various embodiments of the present invention, optional step 260 may compare predetermined customer needs or goals with the funds that have been evaluated. In some aspects, customers may be individual investors. These investors may have individual goals or objectives in their various investments. Goals may be based on individual propensity to take risk and an individual's ability to understand complex diversification strategies or techniques.

In still other aspects, customers may be plan sponsors that select broadly diversified QDIAs for participants in the sponsor's plan. In some cases, plan sponsors may desire to select target date funds for use as a QDIA. QDIAs selected for use in a sponsor's plan may select a fund based on goals and objectives of that sponsor's plan. The plan sponsor may also desire that the criteria for the sponsor's selection of a fund be documented for explanation or regulatory purposes. In some instances, a plan sponsor may have an Investment Policy Statement ("IPS") that guides the sponsor in making various decisions related to any QDIA the sponsor selects. Some aspects of the invention contemplate using the goals and objectives stated in the sponsor's IPS in order to determine optimal funds for use as a QDIA.

According to various embodiments of the present invention, the various goals or objectives of a customer may be displayed alongside the summary of the various target date funds. In one of these embodiments, ranges of possible user goals or objectives may be aligned on a Cartesian coordinate system next to the various plotted target date funds. The individual consumer may then use the range of possible goals or objectives, with the plotted target date funds, in order to determine ideal funds for that customer, in some aspects of the invention, the determined goals or objectives may be plotted on the Cartesian coordinate system in order to direct a customer to various funds that most closely match the goals or objections for that customer. Some of these aspects may highlight a certain area of the Cartesian coordinate system that signifies ideal candidate funds for the customer.

Figure 2B:
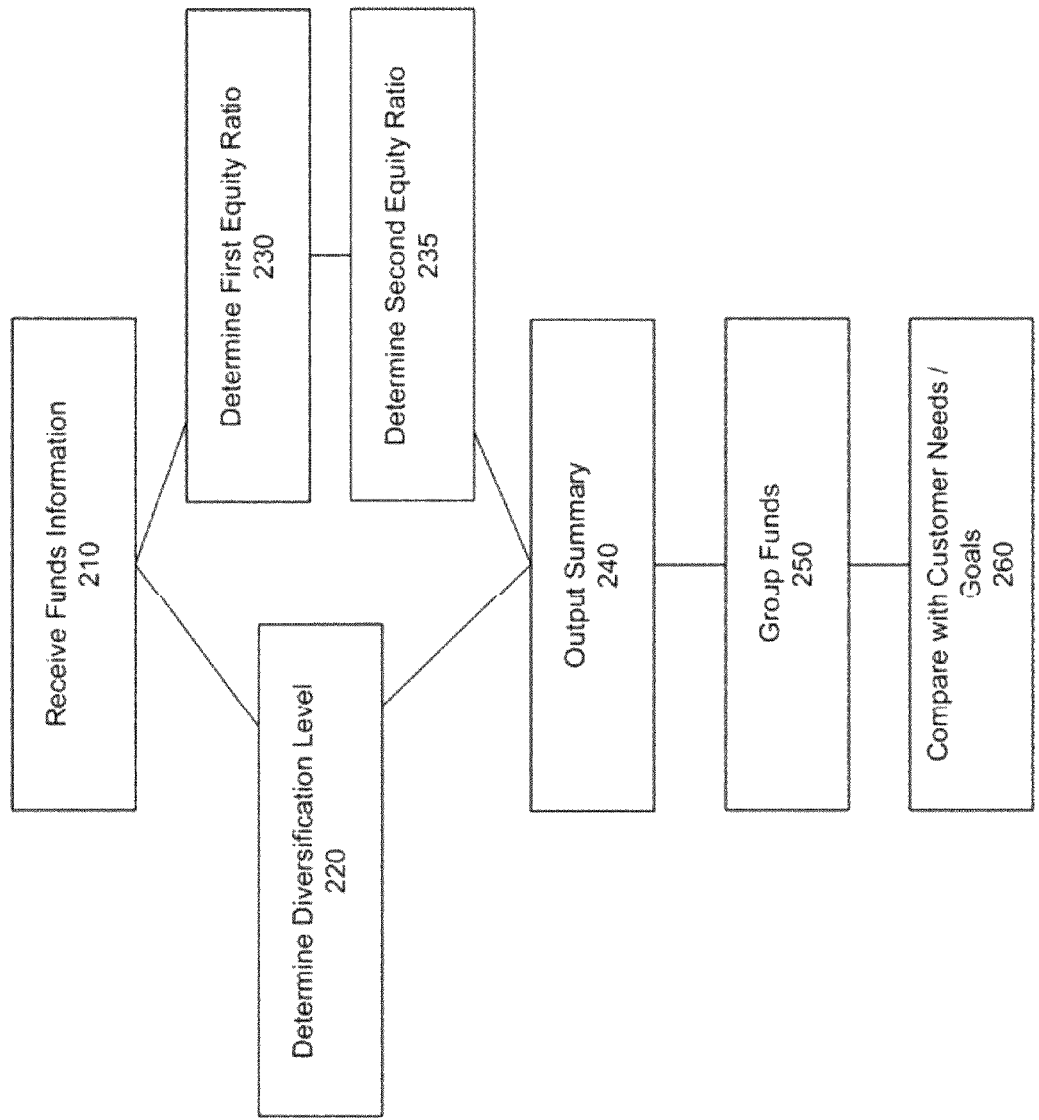

FIG. 2B depicts a flow diagram for evaluating funds in accordance with various needs or goals of a customer according to various embodiments of the present invention. First, at step 210, information about target date funds to be evaluated is gathered. This information may be gathered from a proprietary or third-party database, or a series of databases. In some aspects of the invention, this data may come from investment or financial institutions that market or manage the target date funds to be evaluated. In still other aspects, the information may be first gathered and collated by a third party organization, and then received from the third party organization. In still other aspects, information about target date funds to be evaluated may be proprietary information under control of the same entity that is conducting the method of evaluating funds described herein.

In some aspects and embodiments of the invention, a diversification level and/or equity ratio may be determined at steps 220, 230, and/or 235. Various embodiments and aspects of the invention contemplate conducting these steps either serially or in parallel. In those embodiments and aspects where steps 220 and 230 are conducted serially, they may be conducted in any order.

In some aspects of the invention, step 220 determines a diversification level of each of the various target date funds to be evaluated. Diversification levels may be based on various optional factors, and may be embodied as a ratio, value, percentage, ordinal, or any other metric, including any discrete or continuous valuation, appreciated by those of skill in the art. In one illustrative example, a diversification level may be on a scale from 1-15, where lower values represent lower diversification amongst asset classes in a fund. In still another illustrative example, a diversification level may be between 0 and 1 (or 0% and 100%), where lower values represent lower diversification amongst asset classes in a fund. In still other examples, higher values may represent lower diversification amongst asset classes in a fund. In various embodiments and aspects of the invention, an asset class may be defined by whether the asset is equity, whether the asset is a bond, the category of business to which the asset is tied, a subcategory of business to which the asset is tied, the credit worthiness of a business to which the asset is tied, market capitalization or region of the business to which the asset is tied, duration of life or existence of the assets, or any other type of asset distinctions appreciated by those of skill in the art. In some aspects of the invention, a specific asset owned by the fund may be a fund itself, and may have multiple asset classes within it. In some of those aspects, the specific asset's diversification level may be evaluated based upon the various assets and allocation of those assets contained therein.

In determining the asset diversification level at step 220, the method may evaluate whether a given target date fund invests in traditional asset classes or in an extended set of asset classes in similar methods to those described herein. In one illustrative example, commodities exposure may be calculated separately or inclusively and may add to or detract from the diversification valuation determined above. In some different variations of the example, funds from an individual management company may be evaluated individually, or a company-wide diversification level may be determined through an evaluation across each of the company's suite of target-date funds. In some variations of the example, the diversification valuation determined above may be adjusted higher or lower if a minimum threshold allocation is made to an underlying mutual fund that is categorized as either a specialty-natural resources, hedge funds, long and short assets, direct real estate, currency, convertibles, sector specific assets, futures, allocated or strategic assets, foreign real estate, or specialty-precious metals fund. In still other variations, adjustments may be made based upon other specialty underlying funds in the target date fund that meet a minimum asset allocation threshold. In some cases, this threshold may be a percentage, such as 2%, and in other cases, the threshold may be zero.

In some aspects of the invention, steps 230 and 235 determine equity allocation ratios of each of the various target date funds to be evaluated. Each of the equity allocation ratios may be obtained from information published by the manager of a target date fund, as published in a prospectus relating to the fund. Equity allocations may be derived from the glide path of the target date fund on the prospectus. In some of these aspects, an equity allocation ratio may be determined from the projected equity allocation at a predetermined point in time. In some aspects, this time may be at the target date of retirement for the specific target date fund. In some other aspects, this time may be after the target date of retirement, such as at a terminal equity allocation value. In still other aspects, this time may be before the target date of retirement, such as at the time of evaluation of the fund or a number of years before the target date (for example, one, five, ten, fifteen, twenty, or twenty five years before). In still other aspects, equity allocations may be derived from other public or proprietary information, such as newswires, fund information services such as Morningstar™, historical information about the manager or management team running the fund, or other information possessed by the entity conducting the fund evaluation. In some of these instances, historical information about the past performance of fund managers running target date funds may be used to extrapolate or predict the future management of target date funds being evaluated.

In one illustrative example, a first percentage of equity exposure may be calculated at a target age of 65. In this example, the target age of 65 is also the target date of retirement for the funds being evaluated. Additionally, a second percentage of equity exposure may be calculated at a target age of 55. In this example, the target age of 55 is ten years before the target date of retirement. In this example, the percentages of equity may be gathered from the prospectus of the company that manages the target date fund being evaluated. Here, the prospectus may say that, upon reaching the target date of the fund, the equity allocation may be 10%. Accordingly, the percentage of equity exposure would be 10% or 0.1.

After determining the appropriate diversification levels and equity ratios, some aspects and embodiments of the invention may output a summary of the determinations on each of the funds at step 240. In some of the various embodiments of the present invention, at least one Cartesian coordinate system may be created for display to an individual. In some aspects of the invention, the Cartesian coordinate system may be two-dimensional, in still other aspects, the Cartesian coordinate system may be three-dimensional or multi-dimensional. In some of the embodiments of the invention, the Cartesian coordinate plane may contain axes measuring the determined diversification levels of the various target date funds against determined equity allocation ratios of those funds. In an illustrative example of a three-dimensional system, an x-axis may measure a first equity allocation ratio or percentage, a y-axis may measure an asset class diversification level, and a z-axis may measure a second equity allocation ratio. Other embodiments and aspects contemplate using different variables on any of the axes. In yet another example, two two-dimensional systems may be displayed. The first system may plot funds based on axes consisting of an asset diversification level measure and an equity ratio at the time of retirement. The second system may plot funds based on axes consisting of an asset diversification level measure and an equity ratio at a time prior to or after retirement. In this example, comparisons between the two coordinate systems on a single or multiple displays may allow a viewer to discern differences in the glide paths of underlying funds without having to understand how to read a glide path itself.

Figure 5:
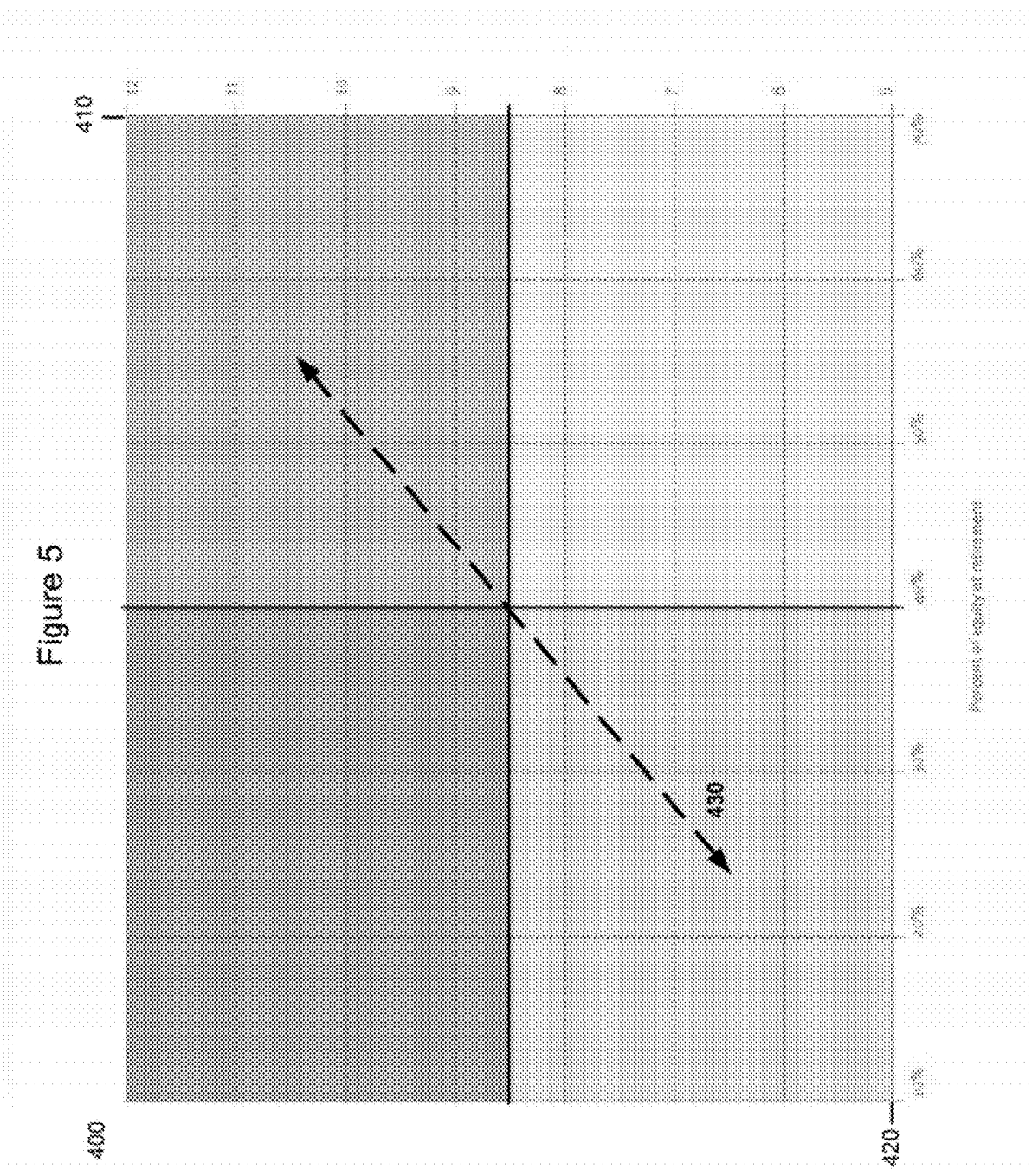
FIG. 5 illustrates a three-dimensional display from a system for evaluating funds according to various embodiments of the present invention.

An illustrative example of a three-dimensional coordinate system to be output at this step is shown in FIG. 5. There, coordinate system 500 contains three axes. Axis 510 may measure a diversification level of funds to be plotted on coordinate system 5(K). Axis 520 may measure a percentage/ratio of equity at the target date of retirement of funds to be plotted on coordinate system 500. Axis 530 may measure a percentage ratio of equity at the initial allocation of the funds to be plotted on coordinate system 500. It may be appreciated by those of skill in the art that axis 530 of the coordinate system 500 may represent other variables by which target date funds are evaluated, such as management style or product architecture.

In still other of the various embodiments of the invention, the diversification levels and equity ratios may be saved in a computer-readable file for use on a personal computer device, mobile computing device, or any other type of specialty or general purpose computer. Other embodiments contemplate printing to a screen, paper, or other output, a listing of evaluated target date funds, along with the corresponding diversification levels and equity ratios for those funds. In some aspects of the invention, the funds may be filtered based on pre-selected or predetermined variables. In other aspects, the funds may be divided into groups based on the determined diversification levels or equity ratios. In still other embodiments of the invention, a computer display may be presented with controls for a user to filter a listing or graphical representation of the evaluated target date funds as described above.

According to some of the various embodiments of the invention, optional step 250 may group various funds in the output summary so that similarities and differences amongst those funds may be more readily apparent. In some of these embodiments, individual funds may be grouped by proximity to one another. In some aspects, the grouped funds may be identified by visual indicia, such as coloring or the circling of those funds. In some other aspects of the invention, a Cartesian coordinate system may be displayed to a user, with individual funds plotted on that system. In these aspects, the coordinate system may be divided into quadrants, such that each quadrant identifies similarly situated target date funds. In still other embodiments of the invention, target date funds may be split into subgroups. These subgroups may be based on similarities in asset diversification or equity allocation ratios. These subgroups may also be based on other factors and characteristics of target date funds being evaluated. In these instances, funds may be grouped based on whether a fund maintains a passive or active management style, or based on whether the fund is a single- or multi-family.

In an illustrative example of grouping funds, a three-dimensional grid may be divided along the plane made up by the x and y axes. The area above this plane may signify a high equity allocation ratio at the onset of the fund. The are below this plan may signify a low equity allocation ratio at the onset of the fund. Further, in this example the two grid may be further divided into quadrants based upon the x and y axes. One quadrant may signify a lower equity allocation ratio and high diversification level. A second quadrant may signify a lower equity allocation ratio and low diversification level. A third quadrant may signify a high equity allocation ratio and low diversification level. A final, fourth quadrant may signify a high equity allocation ratio and a high diversification level. In total, eight distinct groupings exist in this illustrative example in order to group similarly situated funds for comparison by a customer.

According to some of the various embodiments of the present invention, optional step 260 may compare predetermined customer needs or goals with the funds that have been evaluated. In some aspects, customers may be individual investors. These investors may have individual goals or objectives in their investments. Goals may be based on individual propensity to take risk and an individual's ability to understand complex diversification strategies or techniques.

In still other aspects, customers may be plan sponsors that select broadly diversified QDIAs for participants in the sponsor's plan. In some cases, plan sponsors may desire to select target date funds for use as a QDIA. QDIAs selected for use in a sponsor's plan may select a fund based on goals and objectives of that sponsor's plan. The plan sponsor may also desire that the criteria for the sponsor's selection of a fund be documented for explanation or regulatory purposes. In some instances, a plan sponsor may have an IPS that guides the sponsor in making various decisions related to any QDIA the sponsor selects. Some aspects of the invention contemplate using the goals and objectives stated in the sponsor's IPS in order to determine optimal funds for use as a QDIA.

According to various embodiments of the present invention, the various goals or objectives of a customer may be displayed alongside the summary of the various target date funds. In one of these embodiments, ranges of possible user goals or objectives may be aligned on a Cartesian coordinate system next to the various plotted target date funds. The individual consumer may then use the range of possible goals or objectives, with the plotted target date funds, in order to determine ideal funds for that customer. In some aspects of the invention, the determined goals or objectives may be plotted on the Cartesian coordinate system in order to direct a customer to various funds that most closely match the goals or objections for that customer. Some of these aspects may highlight a certain area or volume of the Cartesian coordinate system that signifies ideal candidate funds for the customer.

Figure 3:
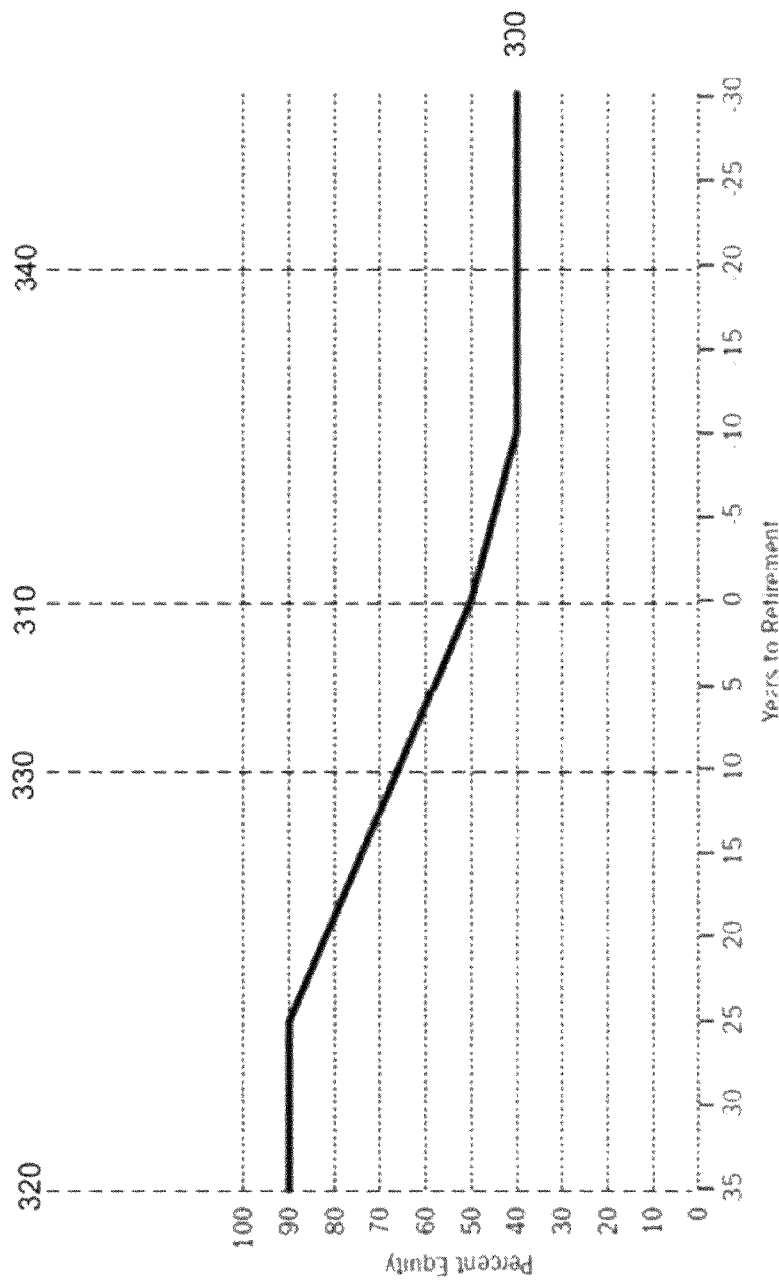
FIG. 3 illustrates a sampling of a fund's glide path in various methods according to various embodiments of the present invention.

FIG. 3 illustrates a sampling of a fund's glide path in various methods according to various embodiments of the present invention. Glide path 300 illustrates the percentage of assets that are owned by a target date fund at any given time throughout the life of the fund. In this illustrative example of sample glide path 300, the target date fund begins with a 90% equity allocation percentage at the creation of the fund, which is 35 years before the target date of retirement. Beginning at the point 25 years before retirement, the glide path gradually decreases its equity allocation ratio until it reaches the target date of retirement; at which point this illustrative glide path 300 has a 50% equity allocation. Glide path 300 continues to decrease its equity allocation until 10 years after the target date of retirement, at which point it will have a 40% equity allocation in this example. This point at which the glide path stabilizes may be known as a terminal allocation. In other embodiments or aspects of the invention, glide paths may reach a terminal allocation at the target date of retirement or before the target date of retirement, as can be appreciated by those of skill in the art. Furthermore, other curves, slopes, and variations on glide path 300 may be appreciated by those of skill in the art. The specific posturing of glide path 300 is for illustrative and exemplary purposes only.

According to various embodiments of the invention, a sample glide path 300 may be sampled in order to determine equity allocation ratios or percentages to be used when evaluating a target date fund. A target date fund's glide path may be measured for an equity allocation at any point in time that the fund exists. In some aspects of the invention, the fund's glide path 300 may be measured at retirement 310, at formation/initial allocation 320, before retirement 330, or after retirement 340. It may also be noted that in this illustrative example, measurement 340 also occurs at the terminal allocation, however those of skill in the art may appreciate that allocations may be measured after retirement but not at a terminal allocation as well.

Figure 6:
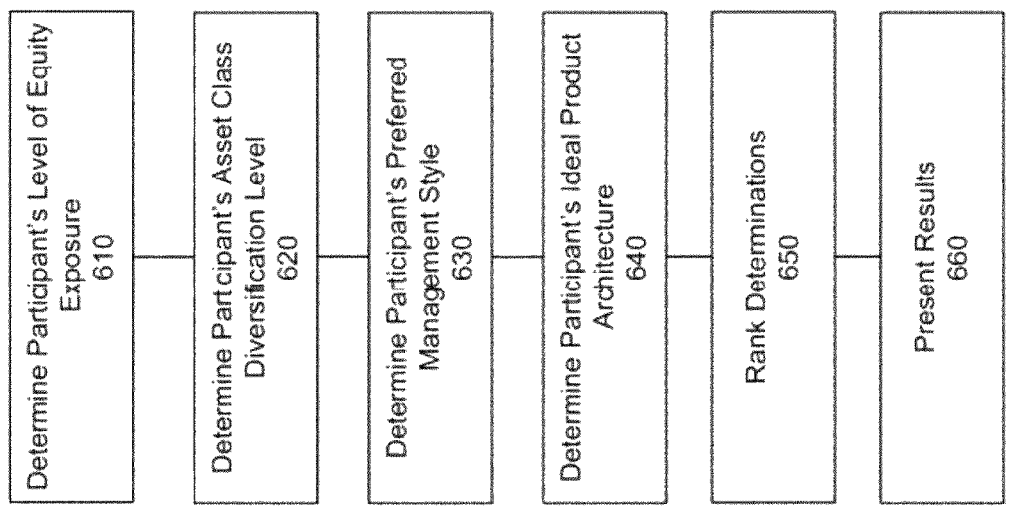
FIG. 6 is a flow diagram for evaluating a customer's needs or goals in fund evaluation according to various embodiments of the present invention.

FIG. 6 is a flow diagram for evaluating a customer's goals or objectives in fund evaluation according to various embodiments of the present invention. As described herein, customers needing a method for evaluating target date funds may be plan sponsors that select broadly diversified QDIAs for participants in the sponsor's plan. QDIAs selected for use in a sponsor's plan may select a fund based on goals and objectives of that sponsor's plan. The plan sponsor may also desire that the criteria for the sponsor's selection of a fund be documented for explanation or regulatory purposes. In some instances, a plan sponsor may have an set of guidelines to direct the sponsor in making various decisions related to any QDIA the sponsor selects. Other types of customers, such as individual investors or other institutional investors, may have their own goals and objectives in selecting a fund for investment. In any of these aspect or embodiments, the ultimate investor of the fund, be it an individual investor, institutional investor, or participant in a sponsor's plan, may be otherwise known herein as a "participant." In aspects where a plan sponsor is conducting an evaluation of various funds, goals and objectives of a participant may be generally directed to a hypothetical participant or the guidelines imposed by or upon that plan sponsor.

In some of the aspects of the invention, step 610 may determine the participant's ideal level of equity exposure. Different participants may have different goals and objectives related to equity exposure, based on each participant's unique investment posturing. The various embodiments and aspects of the invention contemplate that there are pros and cons to both high and low levels of equity exposure, and hence determine the participant's goals by presenting the participant or the participant's agent with a set of questions. An exemplary set of questions directed to step 610 may be found in FIG. 8.

Aspects of the invention contemplate that, although a high percentage of equities offers increased potential for returns and the potential for positive retirement outcomes, a large concentration of equities can also increase risk and the potential for significant retirement shortfall at the wrong time for participants, at retirement. Similarly, a low percentage of equities, on the other hand, may increase the risks of lower returns and reduce opportunities for asset growth. To determine optimal equity exposure, aspects of the invention may present the participant or the participant's agent with a question regarding overall impressions of a hypothetical fund's objective. In some of these aspects, a participant or the participant's agent may be questioned on the investment time horizon for that participant to determine the optimal glide path for that participant. If a participant or the participant's agent seeks to achieve income replacement at retirement, he or she would choose a glide path that has a lower percentage of equities at retirement. If, on the other hand, a participant or the participant's agent seeks to maximize capital appreciation over the participant's lifetime without regard for downside risk in any period, the they would choose a target date fund with a higher equity allocation at retirement. In the illustrative FIG. 8, question 810 is directed to this dichotomy. A participant or the participant's agent may place a rating or determination on the presented question or contrasted goals in order to indicate the participant or the participant's agent's goals and objectives in this area. In the illustrative FIG. 8, this is done by selecting a number from one to five.

Aspects of the invention contemplate that, participant behavior, such as contributions, cash flows, loans, and premature withdrawals, can also impact the volatility hose participants experience. Managers of funds may make assumptions regarding the behaviors of participants in the funds they manage. If a target date fund's assumptions are not in line with actual participant behavior, plan participants may experience higher volatility; which may result in a projected shortfall of assets at retirement. Similarly, if a target date fund's assumptions are in line with actual participant behavior, plan participants may experience lower volatility. To further determine optimal equity exposure, aspects of the invention may present the participant or the participant's agent with a question regarding overall impressions of the participant's expected investment behavior. In the illustrative FIG. 8, question 820 is directed to the dichotomy between interrupted savings and savings maximization. A participant or the participant's agent may place a rating or determination on the presented question or contrasted goals in order to indicate the participant or the participant's agent's goals and objectives in this area. In the illustrative FIG. 8, this is done by selecting a number from one to five. In another illustrative example of an embodiment of the invention, a participant or participant's agent may be presented with two sets of behaviors: a basic industry assumption and a real-life set of behaviors. The basic industry assumption may assume that contributions start at 6% and increase year-by-year until they reach 10% at a age 35, that the participant's salary raises every year, that the participant doesn't borrow against the retirement, that the participant doesn't make premature distributions, and that the participant makes annual post-retirement distributions of a modest 4%-5% In contrast, the real-life set of behaviors presented to the participant or participant's agent may consist of contributions starting at 6% and not reaching 10% until age 55, participants receiving raises every 2 out of 3 years, participants borrowing 15% of the account balance during the life of the fund, participants withdrawing prematurely, and withdrawing over 20% or more in one year post-retirement. In this illustrative example, the user may be presented with a choice between the two scenarios or be asked to select where that participant fits on a sliding scale between the two scenarios.

Aspects of the invention contemplate that, since target date funds adjust their risk profile over time, an evaluation of the participant's desired level of equity exposure at the beginning, middle, and end of the fund's life may be assessed. At each phase of the life of the fund being evaluated, participants or participants' agents may consider the trade-off between seeking upside growth potential and minimizing downside risk. A participant or participant's agent may be queried regarding whether his or her goal for a fund is to minimize the downside risk of investments or to maximize the potential savings balance of that fund. In the illustrative FIG. 8, question 830 is directed to the dichotomy between downside and upside risk. A participant or the participant's agent may place a rating or determination on the presented question or contrasted goals in order to indicate the participant or the participant's agent's goals and objectives in this area. In the illustrative FIG. 8, this is done by selecting a number from one to five.

In some aspects and embodiments of the invention, the responses or values gathered from a participant or participant's agent in step 610 may be totaled or averaged in order to determine an overall asset class diversification level.

Figure 7:
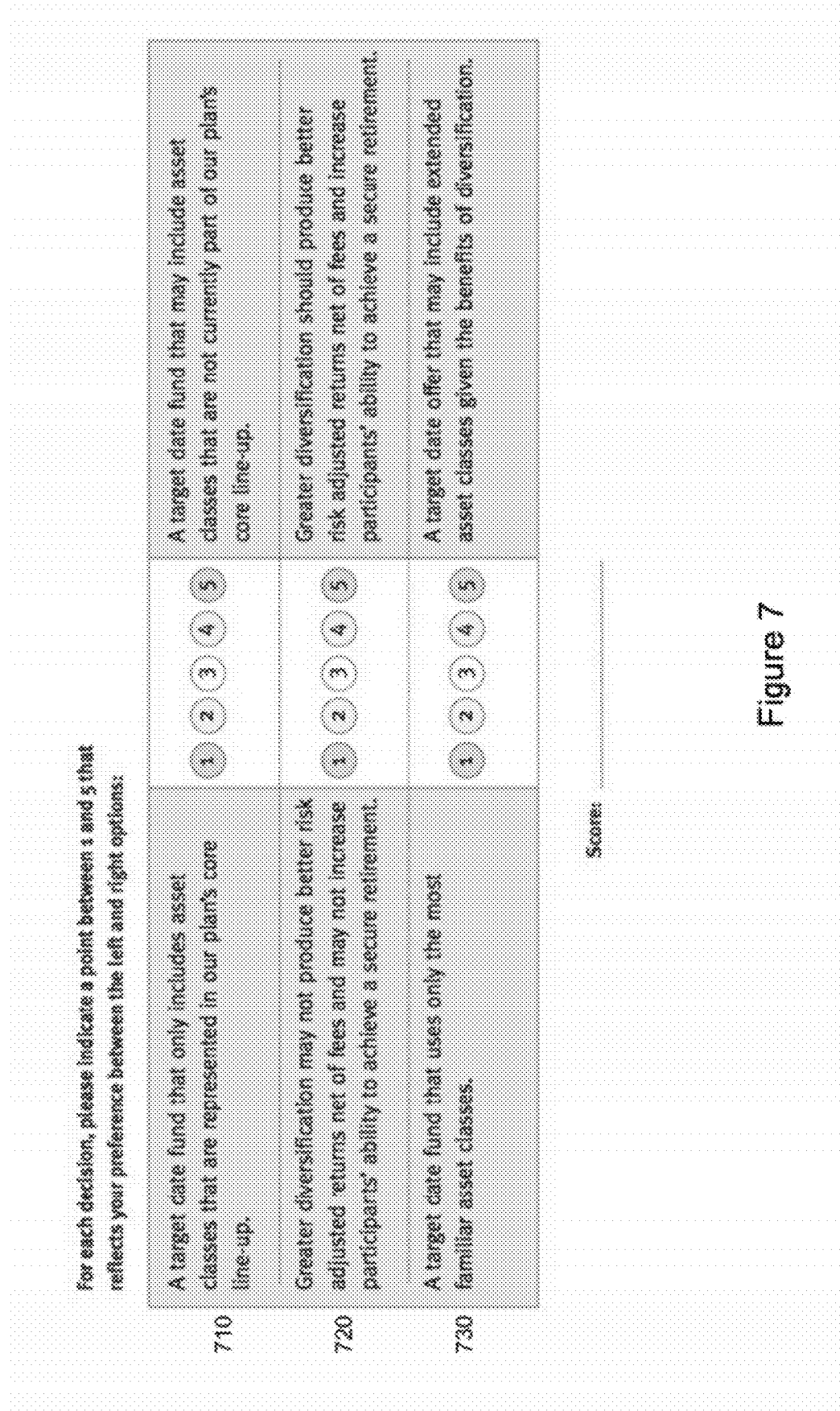
FIG. 7 is a sampling of an illustrative questionnaire directed to asset class diversification needs according to various embodiments of the present invention.

According to some aspects of the invention, step 620 may then determine the participant's ideal asset class diversification level. Different participants may have different goals and objectives related to asset class diversification, based on each participant's unique investment posturing. The various embodiments and aspects of the invention contemplate that there are pros and cons to both high and low levels of asset class diversification, and hence determine the participant's goals by presenting the participant or the participant's agent with a set of questions. An exemplary set of questions directed to step 620 may be found in FIG. 7.

Aspects of the invention contemplate that, although most target date funds diversify across various asset classes in order to create stability in the performance of those funds, some funds diversify amongst typical or standard asset classes (such as stocks, bonds, and currency) while others invest in extended asset classes (such as U.S. REITS, high yield income, international fixed income, emerging markets debt, and direct real estate). Many different participants may have different attitudes towards the use or omission of these extended asset classes in target date funds. To determine optimal diversification, aspects of the invention may present the participant or the participant's agent with a question regarding overall impressions of a hypothetical fund's asset class diversification strategy. In some of these aspects, a participant or the participant's agent may be questioned on the types of asset classes the participant desires to be included in the diversification strategy of an ideal fund. In the illustrative FIG. 7, question 710 is directed to this dichotomy. A participant or the participant's agent may place a rating or determination on the presented question or contrasted goals in order to indicate the participant or the participant's agent's goals and objectives in this area. In the illustrative FIG. 7, this is done by selecting a number from one to five.

Aspects of the invention contemplate that, in addition to the types of asset classes that are included in a diversified target date fund, funds differ in how broadly each asset class is further diversified within the overall portfolio of the fund itself. Some funds have broader diversification which may bring additional responsibilities for those that manage the fund, in turn creating additional costs for the fund's maintenance. Other funds are managed more thinly and, accordingly, may have fewer fees that are passed on to participants in those funds. Many different participants may have different attitudes towards the extent to which fees play a role in the management and diversification of an ideal target date fund. To determine optimal diversification, aspects of the invention may present the participant or the participant's agent with a question regarding overall impressions of a hypothetical fund's fee structure. In some of these aspects, a participant or the participant's agent may be questioned on the whether a more broadly diversified portfolio, which can increase risk-adjusted returns, compensates for higher fees charged and enhanced complexity in assessing the portfolio's performance. In the illustrative FIG. 7, question 720 is directed to this dichotomy. A participant or the participant's agent may place a rating or determination on the presented question or contrasted goals in order to indicate the participant or the participant's agent's goals and objectives in this area. In the illustrative FIG. 7, this is clone by selecting a number from one to five.

Aspects of the invention contemplate that, participants may desire to feel comfortable in the level of support they receive in terms of analysis and reporting from their investment providers. This may especially be true in funds where extended or exotic asset classes are invested in. In various funds and aspects of the invention, support may also come in the form of fund communications that help explain investment strategy and performance information to participants. Many different participants may have different attitudes towards the level of support and corresponding comfort desired from target date fund managers. To determine optimal diversification, aspects of the invention may present the participant or the participant's agent with a question regarding overall impressions of a hypothetical fund's participant support systems. In the illustrative FIG. 7, question 730 is directed to this dichotomy. A participant or the participant's agent may place a rating or determination on the presented question or contrasted goals in order to indicate the participant or the participant's agent's goals and objectives in this area. In the illustrative FIG. 7, this is done by selecting a number from one to five.

In some aspects and embodiments of the invention, the responses or values gathered from a participant or participant's agent in step 620 may be totaled or averaged in order to determine an overall asset class diversification level.

According to some embodiments of the invention, optional steps 630, 640, and 650 may determine a participant's goals or objectives as they relate to the execution profile of any individual target date fund. These analysis may work to further narrow the universe of target date funds being evaluated on behalf of the participant to a more manageable number, or to apply further screens on those target date funds for a more precise evaluation thereof.

Figure 9:
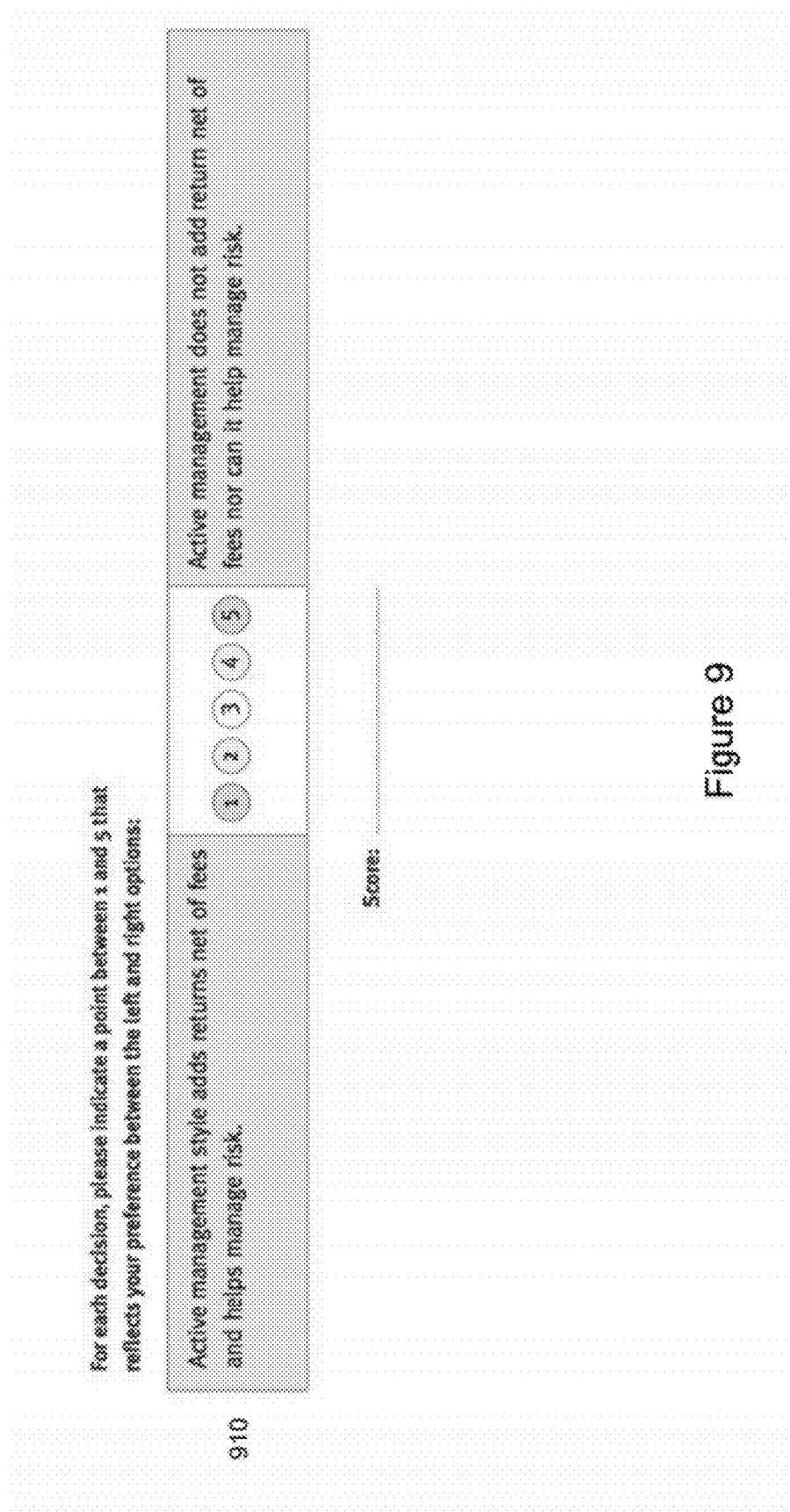
FIG. 9 is a sampling of an illustrative questionnaire directed to management style needs according to various embodiments of the present invention.

According to some aspects of the invention, step 630 may then determine the participant's preferred fund management style. Different participants may have different goals and objectives related to fund management styles, based on each participant's unique investment posturing. The various embodiments and aspects of the invention contemplate that there are pros and cons to both active and passive management techniques, and hence determine the participant's goals by presenting the participant or the participant's agent with a set of questions. Passive management may provide participants with low-cost exposure to the equity and fixed-income markets, and may deliver performance in line with the market. However, some participants may want to evaluate the extent of passive managers' ability to control risk and manage market volatility, an element of a fund's glide path. In some instances, many extended asset classes may not be available to passive investors, as they may not be able to access comparable indexed capabilities. An exemplary set of question directed to step 630 may be found in FIG. 9. A participant or the participant's agent may place a rating or determination on the presented question or contrasted goals in order to indicate the participant or the participant's agent's goals and objectives in this area. In the illustrative FIG. 9, this is done by selecting a number from one to five.

Figure 10:
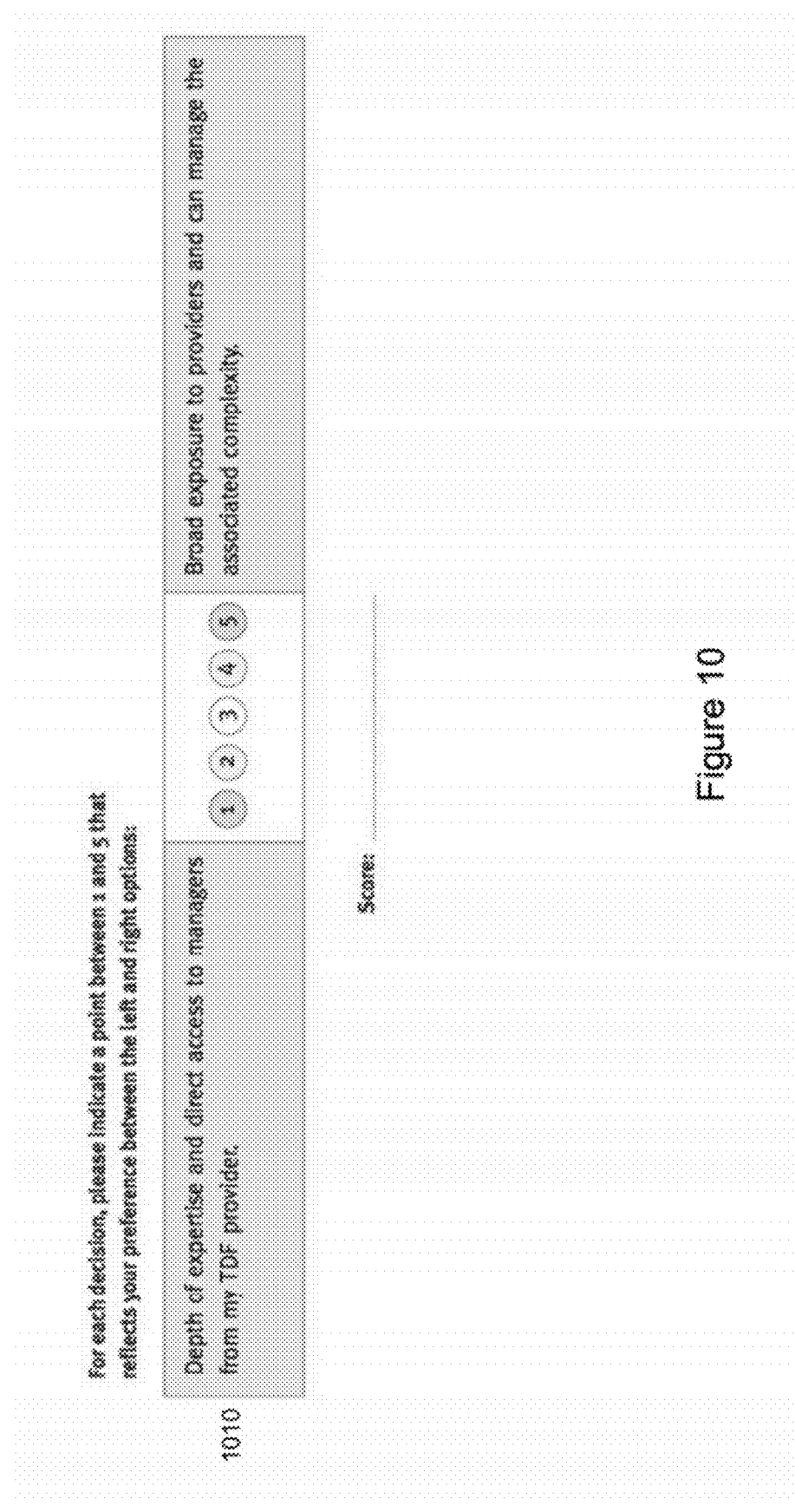
FIG. 10 is a sampling of an illustrative questionnaire directed to product architecture needs according to various embodiments of the present invention.

According to some aspects of the invention, step 640 may then determine the participant's ideal product architecture. Different participants may have different goals and objectives related to fund architecture, based on each participant's unique investment posturing. Aspects of the invention contemplate that funds may be packaged either as single- or multi-family products. Multi-family products may be offered with a broad palette of investment options and may have potential access to "best-of-breed" managers. These products may also be less transparent because of their use of multiple managers in a single fund. In single-family products, a fund may consist of proprietary products from a single provider. This fund, while having less overall diversification, may be more transparent than multi-family funds and may provide direct access to managers from that single provider. The various embodiments and aspects of the invention contemplate that there are pros and cons to both single- and multi-family architecture techniques, and hence determine the participant's goals by presenting the participant or the participant's agent with a set of questions. An exemplary set of question directed to step 640 may be found in FIG. 10. A participant or the participant's agent may place a rating or determination on the presented question or contrasted goals in order to indicate the participant or the participant's agent's goals and objectives in this area. In the illustrative FIG. 10, this is done by selecting a number from one to five.

After determining the goals or objectives of a participant in the above steps, which may be conducted in any order or combination thereof, the participant or participant's agent may optionally rank the importance of the determined categories of goals or objectives. Other contemplated embodiments of the invention may incorporate additional categories of goals or objectives, such as fee structures. Various embodiments and aspects of the invention may use this ranking in order to filter out non-optimal funds from evaluation or to weight the categories in order to present a participant or participant's agent with an improved subset or evaluation of target date funds from which to select.

In some of the aspects and embodiments of the invention, step 660 may take the results of the determinations made above and present them to a participant or participant's agent through the use of a grid, Cartesian coordinate system, or any other method of presentation as described herein. In some aspects, an additional measure of a participant's range of possible goals for asset class diversification or percentage of equities may be displayed alongside a summary of the various target date funds. In one of these embodiments, ranges of possible user goals or objectives may be aligned on a Cartesian coordinate system next to the various plotted target date funds. The individual consumer may then use the range of possible goals or objectives, with the plotted target date funds, in order to determine ideal funds for that customer. In some aspects of the invention, the determined goals or objectives may be plotted on the Cartesian coordinate system in order to direct a customer to various funds that most closely match the goals or objections for that customer. Some of these aspects may highlight a certain area or volume of the Cartesian coordinate system that signifies ideal candidate funds for the customer.

Figure 11A:
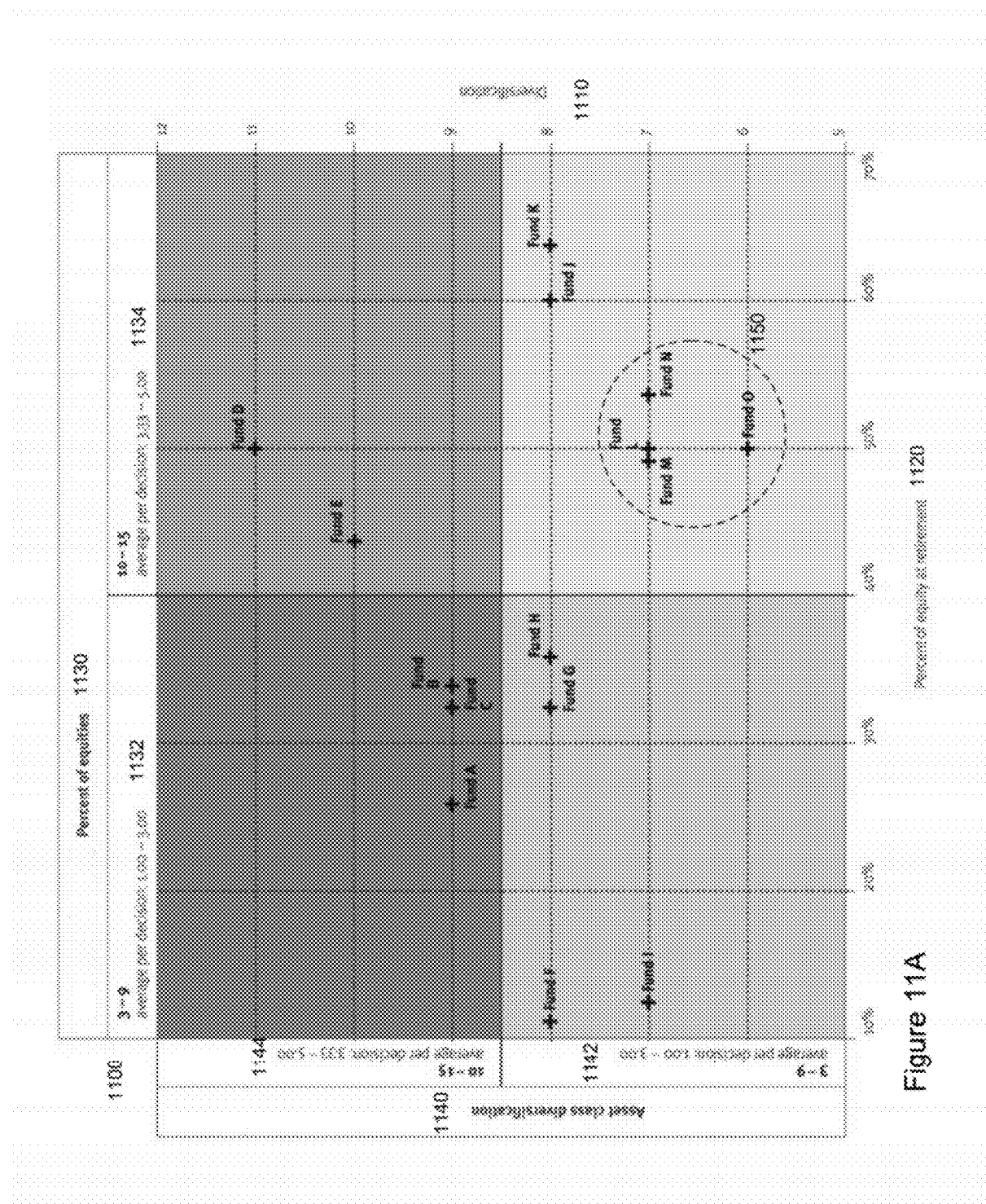
FIG. 11A-B illustrate mappings of various funds on a display of a system for evaluating funds according to various embodiments of the present invention.
Figure 11B:
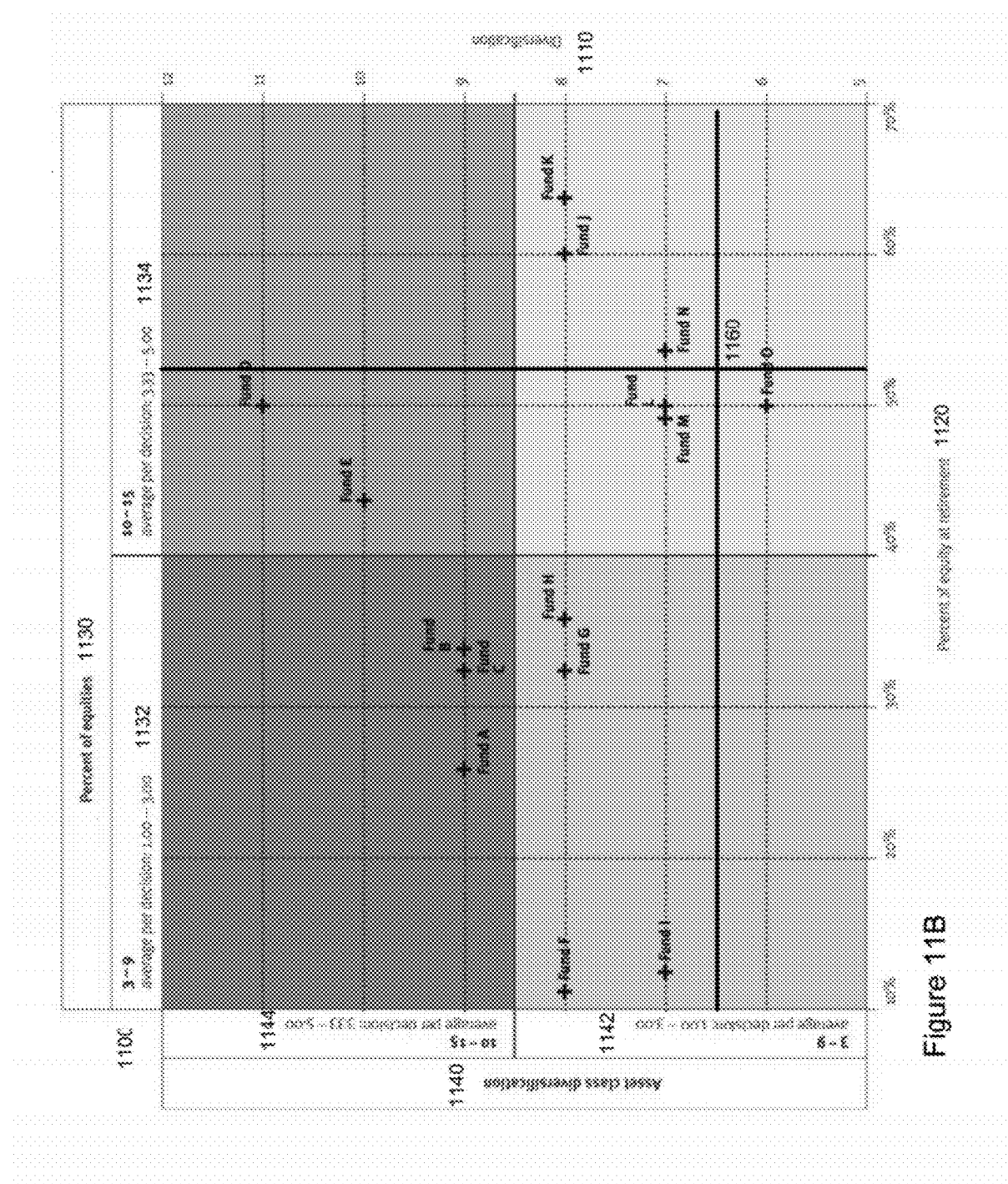

FIGS. 11A and 11B illustrate exemplary mappings of various funds on a display of a system for evaluating funds according to various embodiments of the present invention. In both examples, various target date funds are plotted on a grid 1100 that measures diversification of those funds 1110 against percent of equity at retirement of those funds 1120. Ranges of possible participant asset class diversification goals or objectives 1140 are aligned with axis 1110 and ranges of possible participant percent of equities goals or objectives 1130 are aligned with axis 1120. The possible range of asset class diversification goals or objectives 1140 may be divided into a low diversification objective 1142 and a high diversification objective 144. The possible range of percent of equities goals or objectives 1130 may be divided into a low percent of equities goal 1132 and a high percent of equities goal 1134. The subdivisions 1132, 1134, 1142, and 1144, create four quadrants of similarly situated funds on grid 1100. One quadrant, at the intersection of 1144 and 1132, may signify a lower equity allocation ratio and high diversification level. A second quadrant, at the intersection of 1142 and 1132, may signify a lower equity allocation ratio and low diversification level. A third quadrant, at the intersection of 1142 and 1134, may signify a high equity allocation ratio and low diversification level. A final, fourth quadrant, at the intersection of 1144 and 1134, may signify a high equity allocation ratio and a high diversification level. Embodiments of the present invention are designed such that, when individual target date funds are plotted on grid 1100 according to a method of evaluation, such as those disclosed herein, a customer using grid 1100 may easily and quickly understand the general characteristics of the various funds available to that customer, and to understand the key differences between those funds.

Further embodiments and aspects of the invention contemplate further identifying groups or subgroups of funds that may appeal to a customer or be ideally suited to that customer. FIG. 11A further illustrates the identification of a group of funds 1150 with tightly similar characteristics. In an illustrative example, an evaluation of funds may have yielded the plotting of various funds on grid 1100. Also in that example, an evaluation of the goals and objectives of a customer may have determined that the customer desires or is ideally suited to invest in funds with relatively low asset class diversification and relatively high percentage of equity upon retirement. The evaluation process conducted in this example may further highlight specific funds that fit the determined characteristics and goals of that customer. Here, group 1150 has been highlighted as ideal for the customer.

FIG. 11B illustrates another exemplary embodiment for indicating to a customer a set of ideal funds from a selection of various target date funds that are available. In this example, grid 1100, its axes and data plots are similar to that of FIG. 11A. The grid further indicates two lines forming a crosshairs or point 1160. Each of these two lines indicates a determination of a customer's ideal percentage of equities upon retirement and an ideal asset class diversification. The point 1160 where these two lines intersect indicates the optimal mix of these features. Through the quick examination of this chart, a customer may easily determine the best suited target date funds based on the goals or objectives of that customer.

Having described a number of different embodiments of the invention, it should be apparent to the person of ordinary skill that the invention has numerous benefits and advantages. For example, the ability to quickly organize and categorize target date funds for lay investors enables those investors and the sponsors of plans that must select QDIAs for investors to select appropriate target date funds with minimal confusion.

The ability to present the organization and categorization of those target date funds into a simple, one page visual chart such that a minimal amount of cognitive effort is required in order to process the displayed information when selecting a plan further adds to the ability for the invention to assist investors and plan sponsors in the selection of optimal target date funds.

The determination of ideal factors for a given participant or for participants of a plan sponsor's plans to be used in selecting optimal plans for those participants or plan sponsors allows, for the first time, decision makers to understand how various target date funds comport or, just as importantly, fail to match up, to the goals and objectives of the participant or plan to which a fund is being selected.

The ability for plan sponsors to maintain a written record of their decision making process when determining an optimal target date fund to be offered as a QDIA for individuals participating in the sponsor's investment plans yields a Further, the ability to superimpose or align the characteristics of an ideal target date fund over or with a grid or coordinate system showing the universe, or a sub universe, of available target date funds, allows for a systematic way to select optimal target date funds in an atmosphere that previously was vastly too complicated for most ordinary participants and plan sponsors to understand.

Because the invention allows all types of investors and investment decision makers to understand the universe of target date funds and how those funds relate to that individual's best interests, the present invention presents a new paradigm for investment and retirement planning that previously was not available.

Other benefits and advantages of the invention will be apparent to the person of ordinary skill in the art.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A computer-implemented method of evaluating target date funds, comprising using at least one processor and at least one storage medium to perform the following operations:
    receiving, by a computer from at least one database, information concerning a plurality of target date funds, wherein each target date fund is associated with a glide path and a target retirement date;
    determining a quantified diversification level for each of the plurality of target date funds;
    determining at least one equity ratio for each of the plurality of target date funds;
    outputting a summary of at least a subset of the plurality of target date funds, the summary comprising at least a visual representation of both the diversification levels and the equity ratios associated with the subset of the plurality of target date funds to facilitate a comparison among these target date funds, wherein the outputting comprises:
        creating a coordinate system showing the subset of the plurality of target date funds, and
        plotting each of the subset of the plurality of target date funds on the coordinate system based on their respective diversification levels and equity ratios;
    determining a customer's investment goals or objectives, the customer being selected from a group consisting of: (a) a sponsor of an investment plan, (b) a participant of an investment plan, and (c) an individual investor;
    comparing the customer's investment goals or objectives with visually identifiable groups of the plotted target date funds on the coordinate system; and
    identifying a desired type of target date fund based on the comparison.

2. The method of claim 1, further comprising:
    selecting or formulating a target date fund based on the comparison and the customer's risk tolerance or investment goals or objectives.

3. The method of claim 2, wherein measures of the customer's risk tolerance or investment goals or objectives are derived from an evaluation of a specific investor or investment plan sponsor.

4. The method of claim 2, further comprising:
    presenting the customer with a series of questions relating to the customer's risk tolerance or investment goals or objectives;
    receiving responses to the series of questions; and
    determining measures of the customer's risk tolerance or investment goals or objectives based on the responses.

5. The method of claim 1, further comprising:
    creating a Cartesian coordinate system, wherein one axis measures equity ratios and another axis measures diversification levels;
    plotting each of the subset of the plurality of target date funds on the Cartesian coordinate system based on their respective diversification levels and equity ratios.

6. The method of claim 5, further comprising:
    separating the Cartesian coordinate system into quadrants; and
    grouping funds from the subset of the plurality of target date funds into the quadrants based on their plotting on the Cartesian coordinate system.

7. The method of claim 6, wherein each of the quadrants represents a similar set of characteristics for the target date funds grouped therein.

8. The method of claim 1, further comprising:
    determining the visually identifiable groups of target date funds based on the plotting of all target date funds on the coordinate system; and
    creating groupings of the visually identifiable groups;
    wherein each of the groupings represents a similar set of characteristics for the target date funds grouped therein.

9. The method of claim 1, further comprising:
    aligning measures of the customer's risk tolerance or investment goals or objectives with axes of the coordinate system, such that one or more sections of the coordinate system relate to types of target funds with corresponding risk tolerance or investment goals.

10. The method of claim 9, wherein the measures of the customer's risk tolerance or investment goals or objectives comprise at least one of: desired asset class diversification, scored asset class diversification level, desired percent of equities, scored percent of equities level, or risk-adjusted return.

11. The method of claim 1, wherein the outputting comprises at least one of: printing, drawing to a display device, storing to a computer-readable medium, reciting via audio, creating an audiovisual work, displaying via web page, or creating a presentation.

12. The method of claim 1, wherein the computer is a mobile computing device with a software program for evaluating target date funds, and the method further comprising:
    saving data associated with the quantified diversification levels and the equity ratios in a computer-readable medium accessible by the mobile computing device; and
    providing a user interface on the mobile computing device for user interaction with the outputted summary.

13. The method of claim 1, wherein the equity ratio is a percentage of equity allocation at or near a corresponding target retirement date.

14. The method of claim 1, wherein the diversification level is a measure of asset class diversification.

15. A system for evaluating target date funds, comprising:
    a network interface for connecting with at least one database to receive information concerning a plurality of target date funds, wherein each target date fund is associated with a glide path and a target retirement date;
    a processor, in communication with the network interface, for determining a quantified diversification level and at least one equity ratio for each of the plurality of target date funds;
    an output device, in communication with the processor, for outputting a summary of at least a subset of the plurality of target date funds, the summary comprising at least a visual representation of both the diversification levels and the equity ratios associated with the subset of the plurality of target date funds to facilitate a comparison among these target date funds;
    the processor further configurable to create a coordinate system showing the subset of the plurality of target date funds and to plot each of the subset of the plurality of target date funds on the coordinate system based on their respective diversification levels and equity ratios
    the processor further configurable to:
        determine a customer's investment goals or objectives, the customer being selected from a group consisting of: (a) a sponsor of an investment plan, (b) a participant of an investment plan, and (c) an individual investor;
compare the customer's investment goals or objectives with visually identifiable groups of the plotted target date funds on the coordinate system; and
identify a desired type of target date fund based on the comparison.

16. The system of claim 15, wherein the processor is further configurable to select or formulate a target date fund based on the comparison and the customer's risk tolerance or investment goals or objectives.

17. The system of claim 15, wherein the output device plots the subset of the plurality of target date funds on a Cartesian coordinate system based on each target date funds diversification level and equity ratio.

18. The system of claim 17, wherein the output device further separates the Cartesian coordinate system into quadrants and groups the target date funds into the quadrants based on their location on the Cartesian coordinate system.

19. The system of claim 18, wherein each of the quadrants represents a similar set of characteristics for the target date funds grouped therein.

20. The system of claim 15, wherein the output device further creates visually identifiable groupings of target date funds based on the relative location of the target date funds on the coordinate system, wherein each of the groupings represents a similar set of characteristics for the target date funds grouped therein.

21. The system of claim 15, wherein the output device further visually aligns measures of the customer's risk tolerance or investment goals or objectives with axes of the coordinate system, such that one or more sections of the coordinate system relate to types of target date funds with corresponding risk tolerance or investment goals.

22. The system of claim 21, wherein the measures of the customer's risk tolerance or investment goals or objectives comprise at least one of: desired asset class diversification, scored asset class diversification level, desired percent of equities, scored percent of equities level, or risk-adjusted return.

23. The system of claim 15, wherein the output device is a printer, a display, a computer-readable medium, a speaker, a web page, or a computer.

24. The system of claim 15, wherein the output device is located remotely from the processor and the network interface.

25. The system of claim 15, wherein the output device is part of a mobile computing device.

26. The system of claim 15, wherein the processor is part of a mobile computing device.

27. A non-transitory computer-readable medium having code for evaluating target date funds, the code executable by a processor to perform the steps comprising:
receiving information concerning a plurality of target date funds, wherein each target date fund is associated with a glide path and a target retirement date;
determining a quantified diversification level for each of the plurality of target date funds;
determining at least one equity ratio for each of the plurality of target date funds;
outputting a summary of at least a subset of the plurality of target date funds, the summary comprising at least a visual representation of both the diversification levels and the equity ratios associated with the subset of the plurality of target date funds to facilitate a comparison among these target date funds, wherein the outputting comprises:
creating a coordinate system showing the subset of the plurality of target date funds, and
plotting each of the subset of the plurality of target date funds on the coordinate system based on their respective diversification levels and equity ratios;
determining a customer's investment goals or objectives, the customer being selected from a group consisting of: (a) a sponsor of an investment plan, (b) a participant of an investment plan, and (c) an individual investor;
comparing the customer's investment goals or objectives with visually identifiable groups of the plotted target date funds on the coordinate system; and
identifying a desired type of target date fund based on the comparison.

28. The non-transitory computer-readable medium of claim 27, wherein the code is executable by the processor of a mobile computing device.

29. A computer-implemented method of evaluating target date funds, comprising using at least one processor and at least one storage medium to perform the following operations:
receiving, by a computer from at least one database, information concerning a plurality of target date funds, wherein each target date fund is associated with a glide path and a target retirement date;
determining two or more measurable factors associated with each of the plurality of target date funds;
outputting a summary of at least a subset of the plurality of target date funds, the summary comprising at least a visual representation of said two or more measurable factors associated with each of the subset of the plurality of target date funds to facilitate a comparison among these target date funds, wherein the outputting comprises:
creating a coordinate system showing the subset of the plurality of target date funds, and
plotting each of the subset of the plurality of target date funds on the coordinate system based on their respective two or more measurable factors;
determining a customer's investment goals or objectives, the customer being selected from a group consisting of: (a) a sponsor of an investment plan, (b) a participant of an investment plan, and (c) an individual investor;
comparing the customer's investment goals or objectives with visually identifiable groups of the plotted target date funds on the coordinate system; and
identifying a desired type of target date fund based on the comparison.

30. The method according to claim 29, wherein the step of determining further comprises:
determining a quantified diversification level for each of the plurality of target date funds; and
determining a risk asset ratio for each of the plurality of target date funds, the risk asset ratio measuring a percentage of said each fund allocated to one or more risk assets at or near a corresponding target retirement date.

31. The method according to claim 30, wherein said two or more measurable factors includes the quantified diversification level and the risk asset ratio.

32. The method according to claim 30, wherein the one or more risk assets are selected from a group consisting of:
stocks,
commodities,
futures, high yield bonds,
real estate, and
other risky investments.

33. The method according to claim 30, wherein the risk asset ratio is determined from a glide path of said each target date fund.

34. The method according to claim 30, wherein the diversification level is a measure of diversification among asset classes selected from a group consisting of:
large cap equity,
mid cap equity,
small cap equity,
developed international equity,
emerging markets equity,
REITs,
commodities,
U.S. fixed income,
high yield,
TIPS/inflation,
emerging markets debt.

* * * * *